(12) United States Patent
Wakamatsu

(10) Patent No.: US 10,659,691 B2
(45) Date of Patent: May 19, 2020

(54) CONTROL DEVICE AND IMAGING APPARATUS

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/299,891

(22) Filed: Mar. 12, 2019

(65) Prior Publication Data

US 2019/0208126 A1 Jul. 4, 2019

Related U.S. Application Data

(63) Continuation of application No. 15/368,200, filed on Dec. 2, 2016, now Pat. No. 10,270,973.

(30) Foreign Application Priority Data

Dec. 8, 2015 (JP) .................................. 2015-239747
Dec. 15, 2015 (JP) .................................. 2015-244288
Nov. 8, 2016 (JP) .................................. 2016-218297

(51) Int. Cl.
*H04N 5/232* (2006.01)
*G06T 5/00* (2006.01)
*G06T 7/30* (2017.01)

(52) U.S. Cl.
CPC ......... *H04N 5/23261* (2013.01); *G06T 5/003* (2013.01); *G06T 7/30* (2017.01);
(Continued)

(58) Field of Classification Search
CPC ................ G06T 7/004; H04N 5/23229; H04N 5/23254; H04N 5/23261; H04N 5/23267; H04N 5/23296
See application file for complete search history.

(56) References Cited

U.S. PATENT DOCUMENTS 9,247,138 B2 * 1/2016 Narita ................ H04N 5/23287
9,906,730 B2 * 2/2018 Hashiguchi .......... H04N 5/2259
(Continued)

FOREIGN PATENT DOCUMENTS

CN 1577033 A 2/2005
CN 1845593 A 10/2006
(Continued)

OTHER PUBLICATIONS

The above foreign patent documents were cited in a Jul. 30, 2019 Chinese Office Action, which is enclosed with an English Translation, that issued in Chinese Patent Application No. 201611140487.9.

*Primary Examiner* — Amy R Hsu
(74) *Attorney, Agent, or Firm* — Cowan, Liebowitz & Latman, P.C.

(57) ABSTRACT

A control device includes: a correction control unit configured to acquire a blur detection signal detected by a blur detection unit to calculate a correction amount of an image blur and control an image blur correction unit configured to correct the image blur; a subject detection unit configured to detect a position of a subject in a photographed image and acquire position information of the subject in the photographed image; a tracking control unit configured to perform tracking control of the subject based on the position information of the subject acquired by the subject detection unit to; and a setting unit configured to set a control state of the tracking control unit. The setting unit sets the control state of the tracking control unit by selecting the set control state from a plurality of control states including a first state in which a tracking subject selectable mode is not set and a second state in which the mode is set and a tracking subject is not selected. The correction control unit acquires information on the control state selected by the setting unit and performs control to change characteristics of calculating the (Continued)

correction amount so that an image blur correction effect in the second state is higher than an image blur correction effect in the first state.

12 Claims, 17 Drawing Sheets

(52) U.S. Cl.
CPC ..... *H04N 5/23216* (2013.01); *H04N 5/23254* (2013.01); *H04N 5/23258* (2013.01); *H04N 5/23287* (2013.01); *H04N 5/23293* (2013.01); *G06T 2207/20201* (2013.01)

(56) References Cited

U.S. PATENT DOCUMENTS

| | | | | |
|---|---|---|---|---|
| 2007/0147813 | A1* | 6/2007 | Washisu | H04N 5/23248 396/53 |
| 2007/0183765 | A1* | 8/2007 | Imamura | G03B 5/02 396/55 |
| 2008/0111889 | A1* | 5/2008 | Fujita | H04N 5/145 348/208.5 |
| 2008/0204565 | A1* | 8/2008 | Yumiki | H04N 5/23219 348/208.99 |
| 2008/0231715 | A1* | 9/2008 | Endo | H04N 5/23219 348/208.99 |
| 2010/0194897 | A1* | 8/2010 | Yumiki | G03B 7/091 348/208.4 |
| 2012/0314094 | A1* | 12/2012 | Shibata | H04N 5/23254 348/208.6 |
| 2014/0354780 | A1* | 12/2014 | Matsuura | G03B 35/08 348/47 |
| 2015/0029347 | A1* | 1/2015 | Tsubusaki | H04N 5/23219 348/208.1 |
| 2015/0245020 | A1* | 8/2015 | Meier | G06T 7/73 348/135 |
| 2016/0165139 | A1* | 6/2016 | Takayanagi | H04N 5/23261 348/208.4 |

FOREIGN PATENT DOCUMENTS

| | | |
|---|---|---|
| CN | 104065868 A | 9/2014 |
| CN | 104349061 A | 2/2015 |
| CN | 104469139 A | 3/2015 |
| JP | 2010-093362 A | 4/2010 |

\* cited by examiner

CORRECTION AMOUNT

SUBJECT DETECTION POSITION

ICON

FIG. 14A
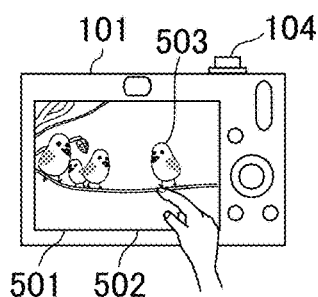
FIG. 14B     FIG. 14C     FIG. 14D
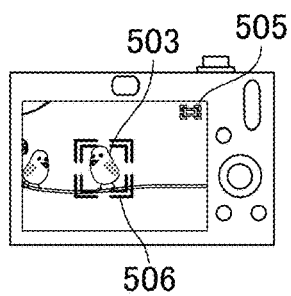 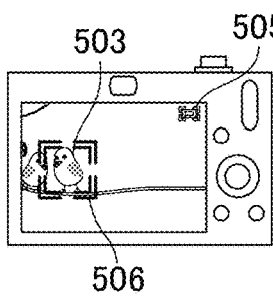 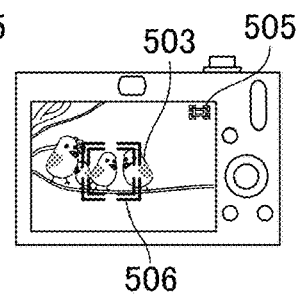
FIG. 14E
CORRECTION AMOUNT
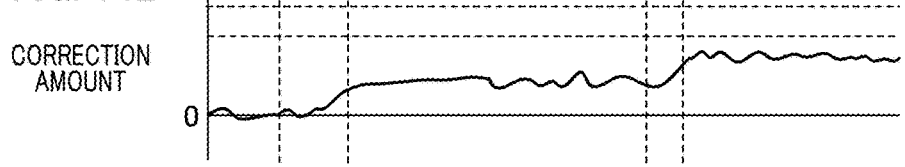
FIG. 14F
SUBJECT DETECTION POSITION
FIG. 14G
SUBJECT RELIABILITY — Th4
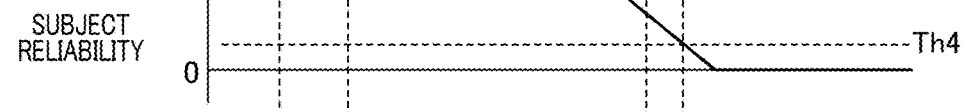
FIG. 14H
ICON
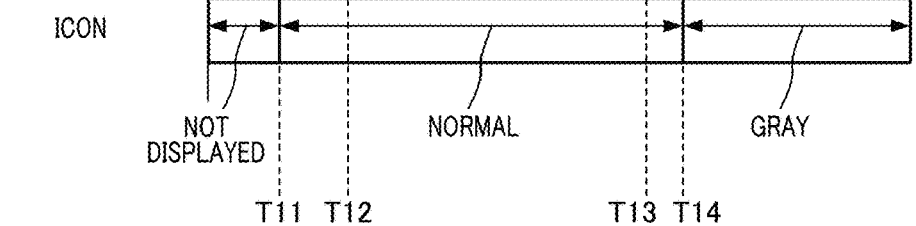
NOT DISPLAYED | NORMAL | GRAY
T11 T12     T13 T14

FIG. 15A
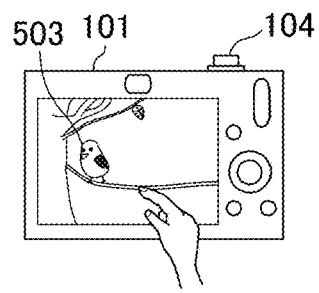
FIG. 15B  FIG. 15C  FIG. 15D
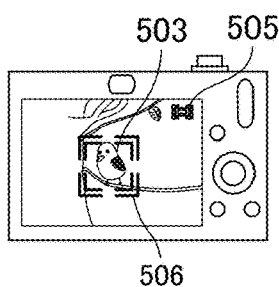 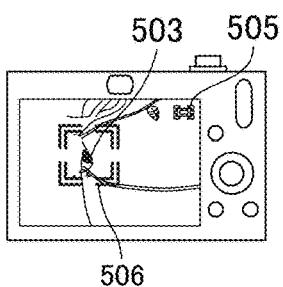 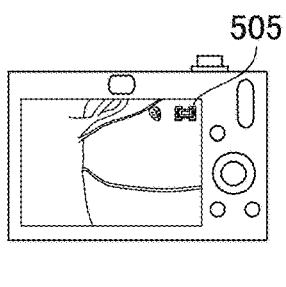
FIG. 15E
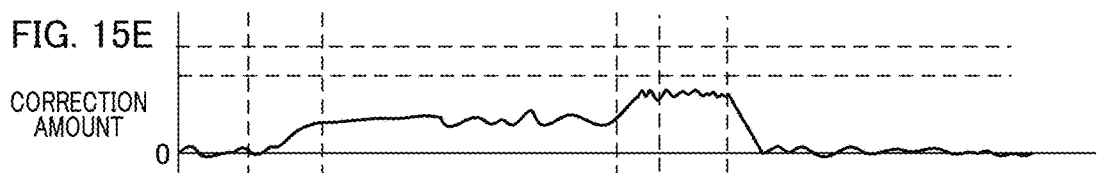
FIG. 15F
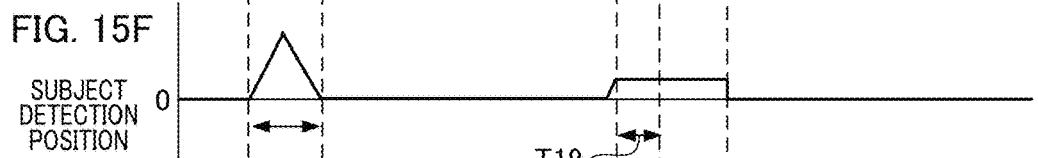
FIG. 15G
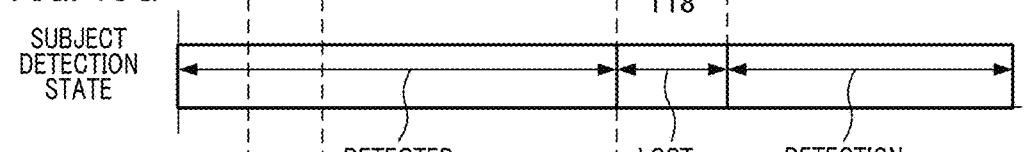
FIG. 15H
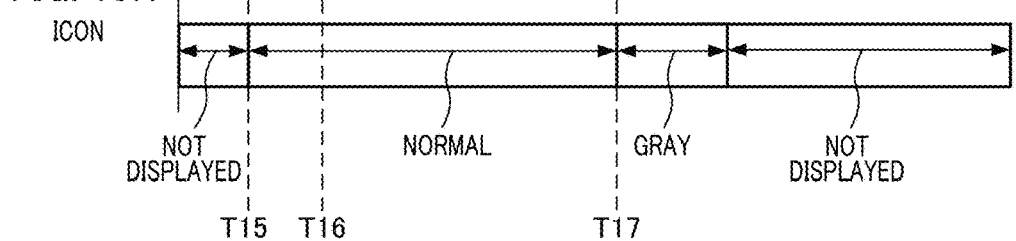

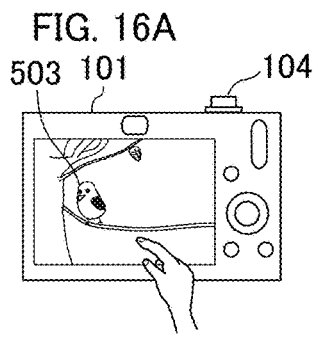
FIG. 16A
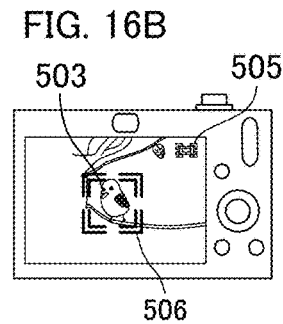
FIG. 16B
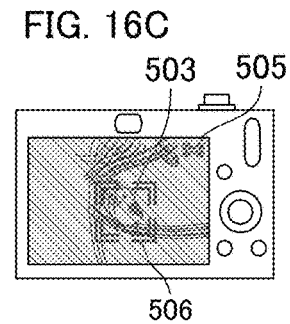
FIG. 16C
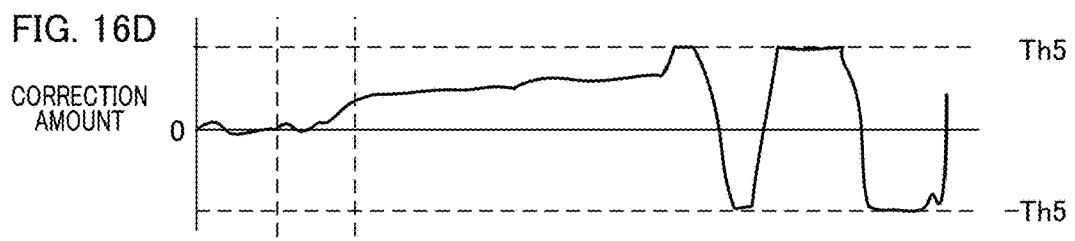
FIG. 16D CORRECTION AMOUNT
FIG. 16E SUBJECT DETECTION POSITION
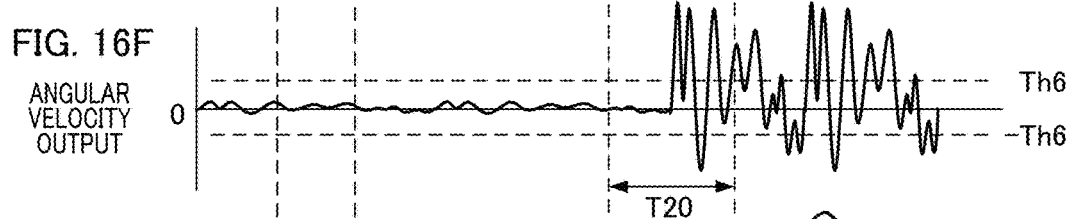
FIG. 16F ANGULAR VELOCITY OUTPUT
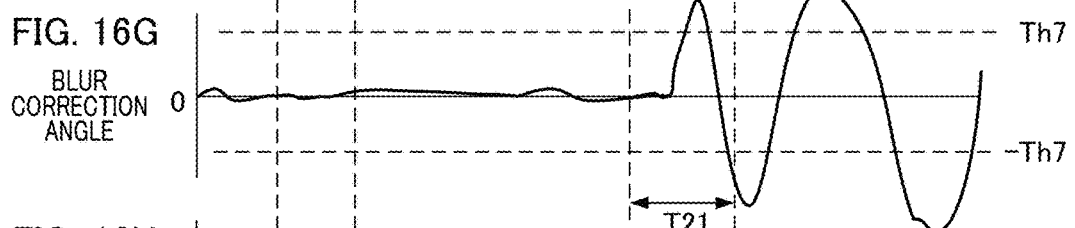
FIG. 16G BLUR CORRECTION ANGLE
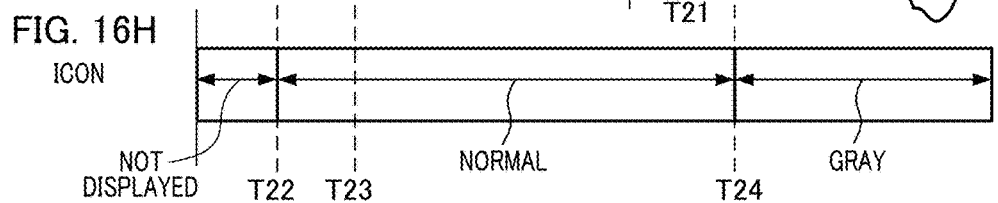
FIG. 16H ICON

CONTROL DEVICE AND IMAGING APPARATUS

CROSS-REFERENCE TO RELATED APPLICATIONS

This application is a continuation of application Ser. No. 15/368,200, filed Dec. 2, 2016 the entire disclosure of which is hereby incorporated by reference.

BACKGROUND OF THE INVENTION

Field of the Invention

The present invention relates to a control device and an imaging apparatus.

Description of the Related Art

An imaging apparatus having an image blur correction function of suppressing a blur of an image due to a hand shake or the like and a face detection function and a human detection function when a subject is a person is known. For example, a pattern for determining the face of a person is determined in advance, and a portion which is identical to the pattern included in a photographed image is detected as a facial image. The detected facial image of the person is referenced in focus control, exposure control, and the like.

The following matters occur when photographing a moving subject or photographing a subject in a telephoto mode with a large focal distance. When a subject moves to be positioned out of a photographic angle of view, it takes a special skill of a photographer to track a continuously moving subject with high accuracy by only a manual operation only. Moreover, when photographing is performed using a camera having a telephoto lens, since the influence of a hand shake on an image blur increases, it is difficult to maintain a main subject at the central position of a photographed image. When a photographer operates a camera to capture a subject within an angle of view again, an image blur is corrected according to a hand shake amount occurring when the photographer operates the camera intentionally. Due to this, depending on the influence of image blur correction control, it may be difficult for a photographer to perform fine adjustment to capture a subject within an angle of view or position a subject image at the central position of a photographed image.

Japanese Patent Laid-Open No. 2010-93362 discloses an imaging apparatus that automatically tracks a subject by moving a portion of an optical system in a direction crossing an optical axis. The position of a subject is detected from an image signal acquired by an imaging element and a subject tracking computation amount is calculated. The subject tracking computation amount is combined with a blur correction computation amount to perform subject tracking control while correcting an image blur.

SUMMARY OF THE INVENTION

A control device includes: a correction control unit configured to acquire a blur detection signal detected by a blur detection unit to calculate a correction amount of an image blur and control an image blur correction unit configured to correct the image blur; a subject detection unit configured to detect a position of a subject in a photographed image and acquire position information of the subject in the photographed image; a tracking control unit configured to perform tracking control of the subject based on the position information of the subject acquired by the subject detection unit to; and a setting unit configured to set a control state of the tracking control unit. The setting unit sets the control state of the tracking control unit by selecting the set control state from a plurality of control states including a first state in which a tracking subject selectable mode is not set and a second state in which the tracking subject selectable mode is set and a tracking subject is not selected. The correction control unit acquires information on the control state selected by the setting unit and performs control to change characteristics of calculating the correction amount so that an image blur correction effect in the second state is higher than an image blur correction effect in the first state.

Further features of the present invention will become apparent from the following description of exemplary embodiments (with reference to the attached drawings).

BRIEF DESCRIPTION OF THE DRAWINGS

FIGS. 14A to 14H are diagrams illustrating the state of the imaging apparatus during tracking control according to the fourth embodiment and an example of a timing chart.

FIGS. 15A to 15H are diagrams illustrating the state of the imaging apparatus during tracking control according to the fourth embodiment and an example of a timing chart.

FIGS. 16A to 16H are diagrams illustrating the state of the imaging apparatus during tracking control according to the fourth embodiment and an example of a timing chart.

DESCRIPTION OF THE EMBODIMENTS

Figure 1:
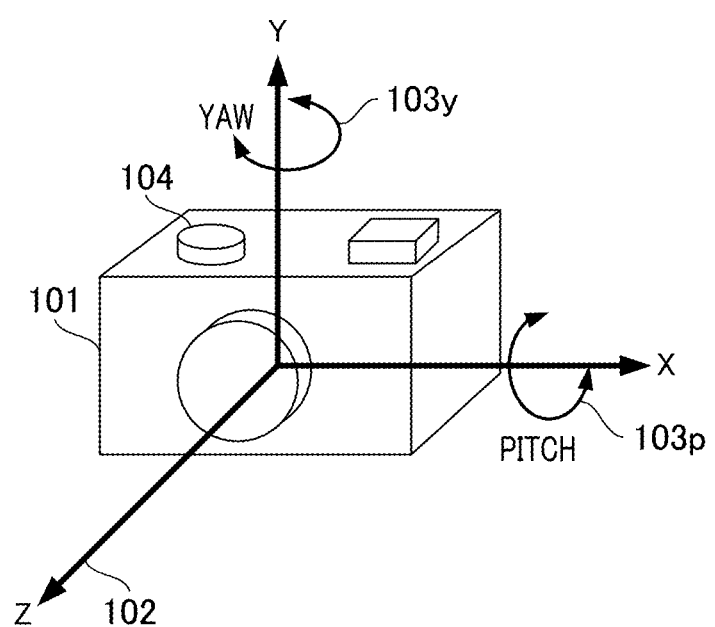
FIG. 1 is a diagram illustrating an imaging apparatus according to a first embodiment and a shaking direction of the imaging apparatus.

Hereinafter, respective embodiments of the present invention will be described in detail with reference to the drawings. In each embodiment, an imaging apparatus including a control device having a function of detecting a shake to correct an image blur and a function of automatically tracking a subject will be illustrated. The present invention can be also applied to an imaging apparatus such as a surveillance camera, a web camera, or a mobile phone without being limited to a digital camera or a digital video camera. Moreover, the present invention can also be applied to lens-replacement and lens-integrated cameras.

First Embodiment

In a system that tracks a subject so that the position of a subject image is maintained at a specific position (for example, the central position) within a photographed image, subject tracking control is control in which a camera performs correction automatically so that the position of the subject image is at the specific position. Therefore, a photographer does not need to perform framing to track the subject during tracking control. In this case, when a blur correction effect (hereinafter referred to as an image blur correction effect) is enhanced by broadening a frequency range of control characteristics when correcting an image blur, it is possible to perform photographing with smooth subject tracking while eliminating the influence of a hand shake or the like.

However, when such subject tracking is performed, although a photographer can perform tracking by designating a subject in the screen in order to photograph a desired subject, it may be difficult to designate the subject itself. For example, when the focal distance of a photographing lens is very large (1000 mm or larger), a subject image may move due to the influence of a hand shake and it may be difficult to capture a subject within an angle of view to perform framing. In this case, when the image blur correction effect is enhanced by broadening a frequency range of the control characteristics of the image blur correction, it is possible to alleviate the difficulty of framing due to the influence of a hand shake. However, when the image blur correction effect is enhanced, if the subject moves, image blur correction is performed on a hand shake amount occurring when the photographer operates the camera intentionally even when a photographer operates the camera so that the subject falls within a photographic angle of view. Depending on the degree of the image blur correction effect, it may be difficult to capture the subject within the angle of view again or finely adjust the position of the subject image to be positioned at the central position of a photographed image. Therefore, in the present embodiment, an imaging apparatus comprises a control device that performs image blur correction and subject tracking control and can improve the easiness of the photographer's framing will be described. The control device is sometimes referred to as "an image position control device", because the control device controls an image position by performing image blur correction and subject tracking control.

Figure 2:
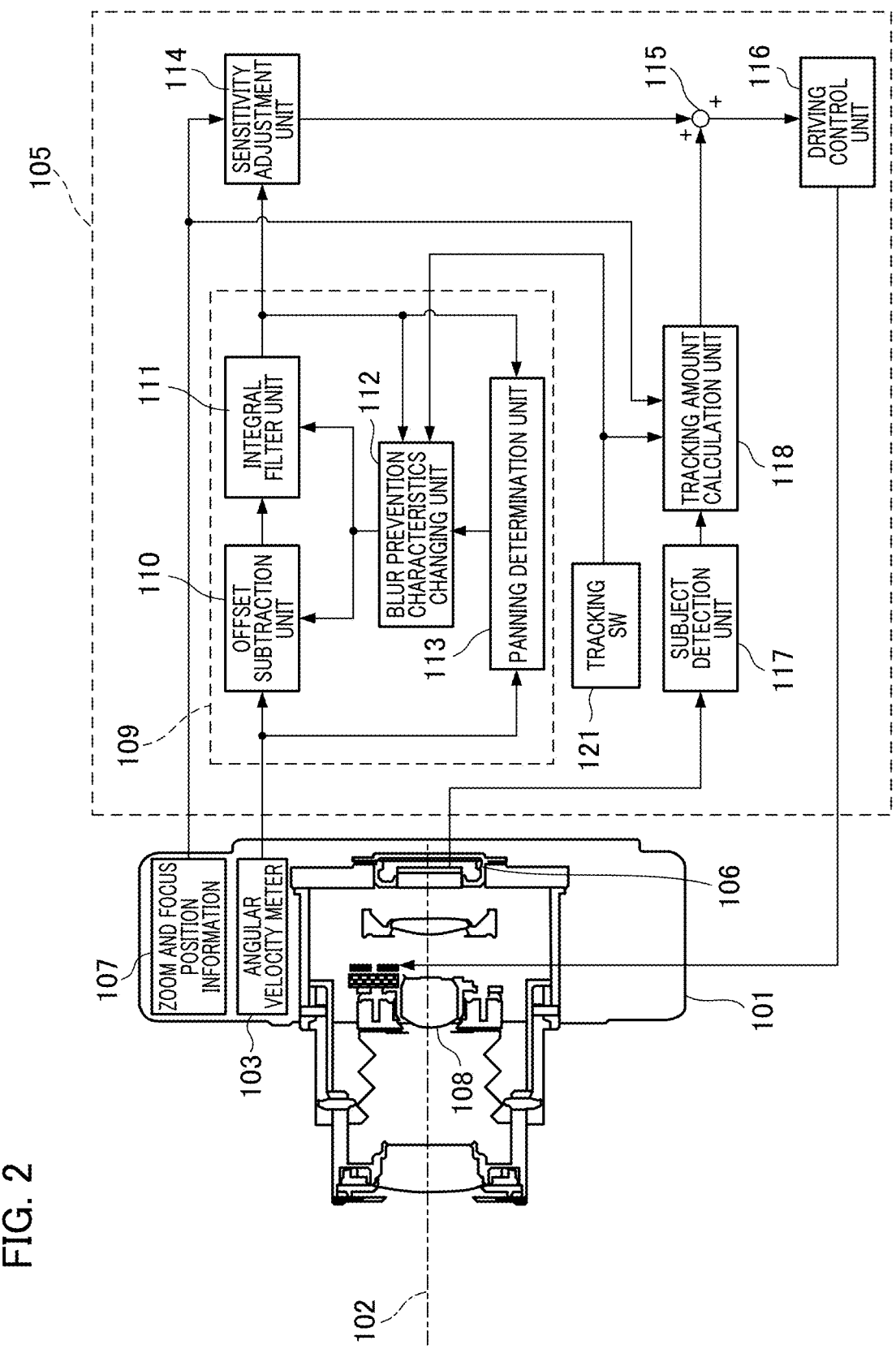
FIG. 2 is a diagram illustrating a configuration example of the imaging apparatus according to the first embodiment.

FIG. 1 is a diagram for describing a shaking direction of an imaging apparatus according to respective embodiments of the present invention. A control device mounted on an imaging apparatus 101 includes an image blur correction device and a subject tracking control device. FIG. 2 illustrates a configuration of an imaging unit of the imaging apparatus 101 and the functional blocks of an image blur correction process and an automatic tracking process executed by a central processing unit (CPU) 105 included in the imaging apparatus 101.

The image blur correction device performs image blur correction on an angular shake in pitch and yaw directions indicated by arrows $103p$ and $103y$ in relation to an optical axis 102, for example. A Z-axis direction of a three-dimensional orthogonal coordinate system is defined as an optical axis direction, a first axis orthogonal to the Z-axis is defined as an X-axis, and a second axis orthogonal to the X-axis is defined as a Y-axis. A direction around the X-axis, indicated by arrow $103p$ is the pitch direction and a direction around the Y-axis, indicated by the arrow $103y$ is the yaw direction.

A release switch 104 for allowing a shutter to travel is provided in a main body of the imaging apparatus 101, and a switch opening/closing signal is transmitted to the CPU 105 according to an operation on the release switch 104. The release switch 104 is a two-step switch in which a first switch (SW1) and a second switch (SW2) sequentially enters into the ON state according to a pressing amount. The SW1 enters into the ON state when the release switch 104 is half-pressed and the SW2 enters into the ON state when the release switch 104 is fully pressed. When the SW1 enters into the ON state, focusing is adjusted by the driving of a focus lens and an appropriate exposure amount is set by the driving of a diaphragm. When the SW2 enters into the ON state, image data obtained from an optical image exposed to an imaging element 106 is recorded on a recording medium.

The CPU 105 functions as the control device of the present embodiment. The present embodiment can be applied to an arbitrary optical apparatus including the CPU 105. The imaging element 106 and a blur correction lens (hereinafter also referred to as a correction lens) 108 that corrects an image blur of a subject image on the screen by moving in a direction different from the optical axis 102 are positioned on the optical axis 102 of the imaging optical system.

The imaging apparatus 101 includes an angular velocity detection unit (hereinafter referred to as an angular velocity meter) that detects an angular velocity of an angular shake. The angular velocity meter 103 detects an angular shake in a rotation direction (the pitch direction) around the X-axis, indicated by arrow $103p$ in FIG. 1 and a rotation direction (the yaw direction) around the Y-axis, indicated by arrow $103y$. A detection signal output by the angular velocity meter 103 is input to the CPU 105, and a blur correction angle is calculated by a blur correction angle calculation unit 109. The output of the blur correction angle calculation unit 109 is input to a sensitivity adjustment unit 114.

When automatic subject tracking control is not performed, the blur correction angle calculation unit 108 calculates the blur correction angle based on the angular velocity meter 103. Specifically, in the blur correction angle calculation unit 109, an offset subtractor 110 removes a direct current (DC) component added as detection noise from the detection signal which is the output of the angular velocity meter 103 to the angular velocity meter 103. Moreover, an integral filter unit 111 executes an integration process and outputs an angle signal. The offset subtractor 110 removes the DC component using a high-pass filter (HPF), for example. Moreover, the integral filter unit 111 uses a filter expressed by Expression (1) below. Expression (1) expresses a filter in which an integrator, the first term on the left side and a HPF, the second terminal on the left side are combined. This filter can be expressed as an expression in which a time constant T is multiplied with an expression of a low-pass filter (LPF) having the time constant T.

$$\frac{1}{s} \times \frac{Ts}{Ts+1} = \frac{T}{Ts+1} \qquad (1)$$

The output of a blur prevention characteristics changing unit 112 is input to the offset subtractor 110 and the integral filter unit 111. The output of a panning determination unit 113 is input to the blur prevention characteristics changing unit 112. The output of a tracking switch (SW) 121 is also input to the blur prevention characteristics changing unit 112, the process of the blur prevention characteristics changing unit 112 corresponding to the tracking SW 121 will be described later.

The panning determination unit 113 acquires the output of the angular velocity meter 103 and the blur correction angle which is the output of the integral filter unit 111 and determines whether the imaging apparatus 101 is panning. Specifically, the panning determination unit 113 compares the angular velocity of the imaging apparatus 101 detected by the angular velocity meter 103 with a predetermined threshold. When a predetermined period (a determination period) has elapsed from the time point at which the detected angular velocity exceeded the threshold, it is determined that the imaging apparatus 101 is panning, and a determination signal is output to the blur prevention characteristics changing unit 112.

When it is determined that the imaging apparatus 101 is panning, the panning determination unit 113 issues an instruction to the blur prevention characteristics changing unit 112 to increase a thrust toward the center of a control range so that the blur correction angle output by the integral filter unit 111 does not become too large. The thrust refers to a control action to control the blur correction angle to approach the center of a control range. Moreover, when it is determined that the imaging apparatus 101 is not panning, the panning determination unit 113 issues an instruction to the blur prevention characteristics changing unit 112 to decrease the thrust toward the center of the control range . Here, the thrust toward the center of the control range may be changed gradually according to the magnitude of panning. The magnitude of panning is the magnitude of the detected angular velocity or the length of a period in which the angular velocity exceeds the threshold. In the present embodiment, a panning operation will be described by way of an example. Since the same process is performed for a tilting operation except for the difference in direction, the detailed description thereof will not be provided.

The blur prevention characteristics changing unit 112 changes the blur prevention characteristics (image blur correction characteristics) according to a panning determination result and an instruction on the magnitude of the thrust toward the center of the control range corresponding to the blur correction angle. For example, when the blur correction angle which is the output of the integral filter unit 111 is larger than the predetermined threshold, the blur prevention characteristics changing unit 112 changes the blur prevention characteristics to control the blur correction angle to approach near the center of the control range. Control is performed according to the magnitude of the blur correction angle so that the blur correction angle approaches near the center gradually. Specifically, control is performed so that the larger the blur correction angle, the larger the thrust toward the center whereas the smaller the blur correction angle, the smaller the thrust toward the center.

The blur prevention characteristics changing unit 112 changes the blur prevention characteristics by changing the frequency characteristics of the offset subtractor 110 or the integral filter unit 111. When an instruction to decrease the thrust is received, the blur prevention characteristics changing unit 112 decreases the cutoff frequency of the HPF of the offset subtractor 110 and decreases the cutoff frequency of the integral filter unit 111. When an instruction to increase the thrust is received, the blur prevention characteristics changing unit 112 increases the cutoff frequency of the HPF of the offset subtractor 110 and increases the cutoff frequency of the integral filter unit 111.

As described above, the blur correction angle calculation unit 109 performs a process of changing the thrust toward the center of the control range according to the panning determination result and the magnitude of the blur correction angle. Due to this, it is possible to calculate the blur correction angle while performing a panning determination process. The blur correction angle signal output by the blur correction angle calculation unit 109 is input to the sensitivity adjustment unit 114.

The sensitivity adjustment unit 114 amplifies the output of the blur correction angle calculation unit 109 based on zoom and focus position information 108 and a focal distance and a photographing magnification derived from these items of information and outputs a blur correction target value. The zoom position information is acquired from a zoom unit and the focus position information is acquired from a focus unit. The reason why the blur correction target value is calculated based on the zoom and focus position information 107 is because blur correction sensitivity on an imaging plane in relation to blur correction stroke of the correction lens 108 changes depending on a change in optical information such as zooming or focusing. The sensitivity adjustment unit 114 outputs the blur correction target value to an adder 115.

When automatic subject tracking is not performed (the tracking correction amount which is the output of the tracking amount calculation unit 118 is 0), the adder 115 outputs the blur correction target value obtained by the sensitivity adjustment unit 114. Only the output of the sensitivity adjustment unit 114 is input to a driving control unit 116. The correction lens 108 functions as a movable unit that shifts a subject position in a photographed image. The driving control unit 116 controls the driving of the correction lens 108 to executes subject tracking control and blur correction.

In the present embodiment, the driving control unit 116 executes image blur correction (optical blur prevention) by driving the correction lens 108 in a direction different from the optical axis direction. Although an image blur correction method which uses the correction lens 108 is employed in the present embodiment, the present invention is not limited thereto, and a method of correcting an image blur by moving an imaging element within a plane vertical to the optical axis may be applied. Alternatively, electronic blur prevention which reduces the influence of a shake by changing a slicing position of an image in each photographic frame output by an imaging element may be applied. Alternatively, a plurality of image blur correction methods may be combined. Furthermore, in the present embodiment, subject tracking control is performed by driving the correction lens or the imaging element and changing the slicing position of an image using the optical blur prevention technique and the electronic blur prevention technique.

Next, a subject position detection process performed by a subject detection unit 117 will be described in detail. The imaging element 106 acquires image information by photoelectrically converting light reflected from a subject to an electrical signal. The image information is converted to a digital image signal by an A/D conversion unit and the digital image signal is transmitted to the subject detection unit 117. When a plurality of subject images are captured within a photographic angle of view, the following methods are used as a method of automatically recognizing a main subject from a plurality of subjects.

A first method of detecting a main subject detects a person. In this case, the subject detection unit 117 detects the face or a human body of a subject. In a face detection process, a pattern for determining the face of a person is determined in advance, and a portion that matches the pattern included in a captured image can be detected as a facial image of the person. The subject detection unit 117 calculates a reliability indicating a probability as the face of a subject for each of the detected subjects. The reliability is calculated from the size of a face region in an image, the degree of matching with the face pattern, and the like, for example. That is, the subject detection unit 117 functions as a reliability calculation unit that calculates the reliability of the subject based on the size of a subject in a photographed image or the degree of matching between the subject and the subject pattern stored in advance.

A second method of detecting a main subject uses a histogram of hue, saturation, and the like in a captured image. A process of dividing a distribution derived from the histogram of hue, saturation, and the like of the image of the subject captured within the photographic angle of view into a plurality of segments and classifying images captured in the respective segments is executed. For example, a histogram of a plurality of color components is created for a captured image and is divided in a mountain-shaped distribution range, images captured in regions belonging to a combination of the same segments are classified, and subject image regions are recognized. By calculating evaluation values for respective recognized subject image regions, a subject image region having the highest evaluation value can be determined as a main subject region.

After the main subject region is determined, it is possible to track the main subject region by detecting a region having a feature amount similar to the feature amount of the main subject region from images sequentially captured by a subsequent live-view operation, continuous shooting, or video capturing using the feature amount of the main subject region. The feature amount of the main subject region is calculated from a hue distribution, a hue size, or the like, for example. The position information of the detected main subject is input to the tracking amount calculation unit 118. The tracking amount calculation unit 118 calculates a tracking correction amount so that the central position of the main subject image is positioned near the center (a target position) of the photographed image. Moreover, a photographer can designate a subject position on a display screen at any time by operating an operation member of the imaging apparatus while viewing a video displayed on the screen of a display unit of the imaging apparatus according to a video signal output. In this case, when the photographer performs an operation of designating a main subject from a plurality of subject images displayed on the display screen, the feature amount such as a hue distribution, a hue size, or the like at the designated position is calculated. A region having a similar feature amount to the feature amount is detected from images obtained sequentially thereafter using the calculated feature amount, and the detected region can be tracked as a main subject region.

Next, a subject tracking control method using the correction lens 108 will be described.

The subject detection unit 117 illustrated in FIG. 2 acquires an image signal obtained by the imaging element 106 and detects an image position (a subject position) of the subject in the photographed image. The subject position information is output to the tracking amount calculation unit 118. The tracking amount calculation unit 118 calculates a control amount used for tracking a subject by the driving of the correction lens 108 based on the zoom and focus position information 107 and the detected subject position information. Hereinafter, a control amount (tracking control amount) for tracking a subject to position the image of the subject at a predetermined position (a target position (the central position in the present embodiment)) of the screen (the range of a photographed image) will be referred to as a tracking correction amount. The tracking amount calculation unit 118 calculates the tracking correction amount according to the state of the tracking SW 121. The tracking correction amount is input to the adder 115 and is added to the blur correction target value which is the output of the sensitivity adjustment unit 114, such that blur correction and tracking control by the driving of the correction lens 108 are performed simultaneously.

Figure 3B:
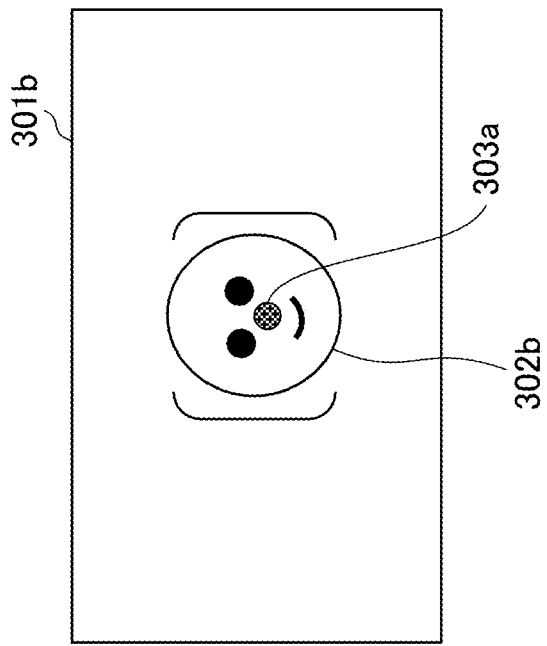
FIGS. 3A and 3B are diagrams for describing tracking control of a detected subject.
Figure 3A:
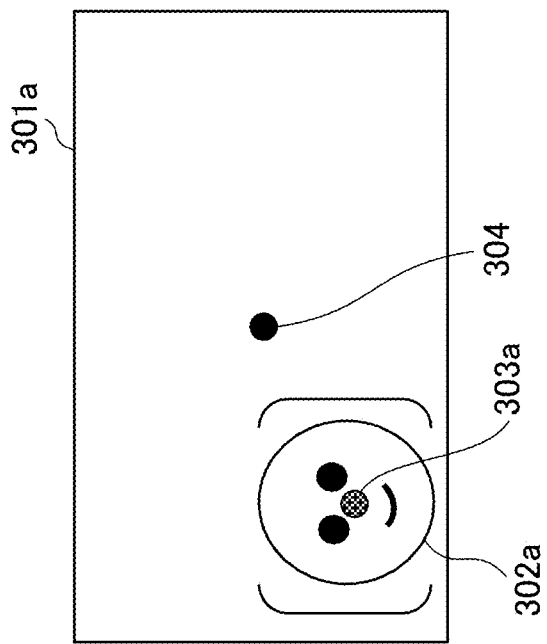

FIGS. 3A and 3B are diagrams for describing tracking control for tracking the detected main subject according to the present embodiment. FIG. 3A illustrates a photographed image 301a before subject tracking control starts. FIG. 3B illustrates a photographed image 301b after subject tracking control starts. In the photographed image 301a of FIG. 3A, a black dot illustrated at the center illustrates a screen central position 304. An image position of a subject 302a before the start of tracking control is away from the screen central position 304. A subject central position 303a illustrates the central position of the subject 302a in the image. When the CPU 105 starts subject tracking control, the distance between the subject central position 303a and the screen central position 304 decreases gradually according to the elapse of time. With the subject tracking control, finally, as illustrated in FIG. 3B, the subject central position 303a becomes substantially identical to the screen central position 304.

Figure 4:
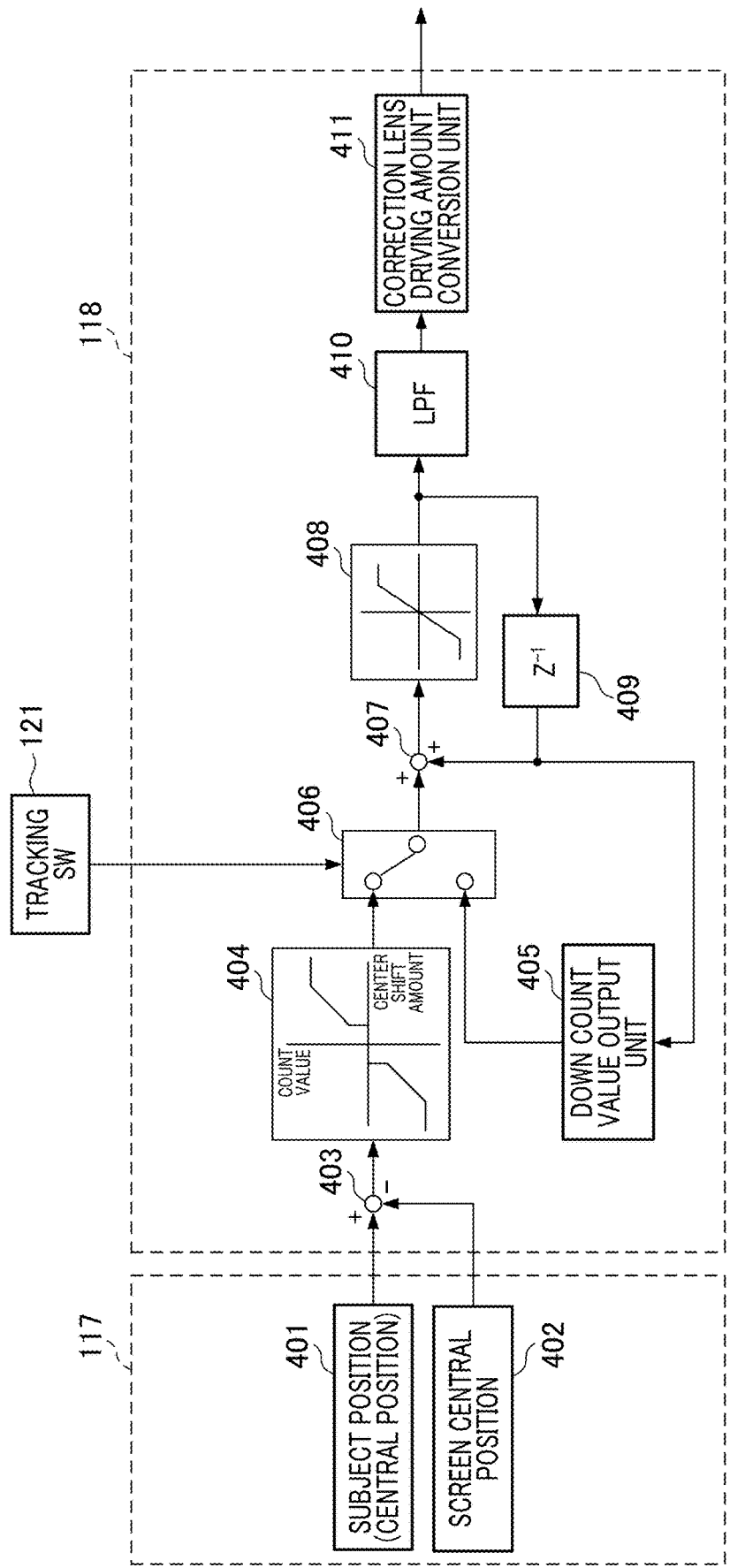
FIG. 4 is a functional block diagram of a tracking amount calculation unit according to the first embodiment.

Next, a tracking amount calculation process of the tracking amount calculation unit 118 will be described with reference to FIG. 4. FIG. 4 is a functional block diagram illustrating an example of the tracking amount calculation unit 118. Although the tracking amount calculation unit 118 calculates a tracking correction amount in the respective axes of the vertical and horizontal directions of the screen, only a single axis will be described for the sake of simplicity.

A subtractor 403 subtracts the coordinate of the screen central position 402 from the correlation of the subject position (the central position) 401 based on the subject position information output by the subject detection unit 117. In this way, a difference amount (hereinafter referred to as a center shift amount) indicating the distance between the central position of a subject image and the screen central position 402 on the image is calculated. The center shift amount is signed data calculated when the difference amount at the screen central position 402 is 0. The output of the subtractor 403 is input to a count value table reference unit (hereinafter simply referred to as a reference unit) 404.

The reference unit 404 calculates a count value for tracking based on the center shift amount (that is, the magnitude of the difference amount). Specifically, the count value is calculated as follows.

When the center shift amount is equal to or smaller than a predetermined threshold A and is equal to or larger than a predetermined threshold "−A," the count value is set to 0 or a minimum value. When the magnitude (absolute value) of the center shift amount is equal to or smaller than a predetermined threshold, a non-sensitive region in which tracking is not performed is set to a predetermined range from the screen central position.

When the center shift amount is larger than a predetermined threshold A or is smaller than a predetermined threshold "−A," the count value is set to increase as the absolute value of the center shift amount increases. The sign of the count value is calculated according to the sign of the center shift amount.

The output of the reference unit 404 is acquired as a first input of a signal selection unit 406. The signal selection unit 406 acquires a down count value output by a down count value output unit 405 as a second input. Moreover, a signal indicating the state of the tracking SW (switch) 121 is input to the signal selection unit 406 as a control signal. When the tracking SW 121 is set to the ON state, the signal selection unit 406 selects the output of the reference unit 404 and outputs the output to an adder unit 407. Moreover, when the tracking SW 121 is set to the OFF state, the signal selection unit 406 selects the down count value and outputs the down count value to the adder unit 407. The down count value will be described later.

The adder unit 407 acquires the output of the signal selection unit 406 and a previous sampling value associated with a tracking amount and adds both values. The output of the adder unit 407 is input to an upper and lower limit setting unit 408. The upper and lower limit setting unit 408 limits the tracking correction amount to be within a predetermined range. That is, the tracking correction amount is limited so as not to be equal to or larger than a predetermined upper limit and not to be equal to or smaller than a predetermined lower limit and the value thereof is changed. The output of the upper and lower limit setting unit 408 is input to a delay unit 409 and a low-pass filter (LPF) 410.

The delay unit 409 outputs a past tracking correction amount (that is, a previous sampling value) obtained a predetermined sampling period earlier than the current time point to the adder unit 407 and the down count value output unit 405 as a calculation result. The down count value output unit 405 outputs the down count value. A previous tracking amount sampling value 409 calculated by post-processing is input to the down count value output unit 405. When the tracking correction amount obtained at a previous sampling time point (the previous sampling value) has a positive sign, the down count value is set to a negative sign. Moreover, when the previous sampling value has a negative sign, the down count value output unit 405 sets the down count value to a positive sign. In this way, processing is performed so that the absolute value of the tracking correction amount decreases. Moreover, when the previous sampling value output by the delay unit 409 is within a range that is near zero (0±predetermined range), the down count value output unit 405 sets the down count value to 0. The down count value is the second input to the signal selection unit 406.

The LPF 410 removes high-frequency noise included during detection of the subject from the output of the upper and lower limit setting unit 408 and outputs the processed signal to a correction lens driving amount conversion unit 411. The correction lens driving amount conversion unit 411 converts the output of the LPF 410 to a signal for allowing the correction lens 108 to perform a subject tracking operation. In this way, a final tracking correction amount is calculated and the correction lens 108 is driven based on the tracking correction amount such that a tracking correction process is performed so that the central position of the subject image is gradually positioned near the center of a photographed image.

By driving the correction lens 108 based on an addition result of the blur correction amount and the tracking correction amount, added by the adder 115 in the above-described manner, image blur correction control and subject tracking control can be performed simultaneously.

Figure 5B:
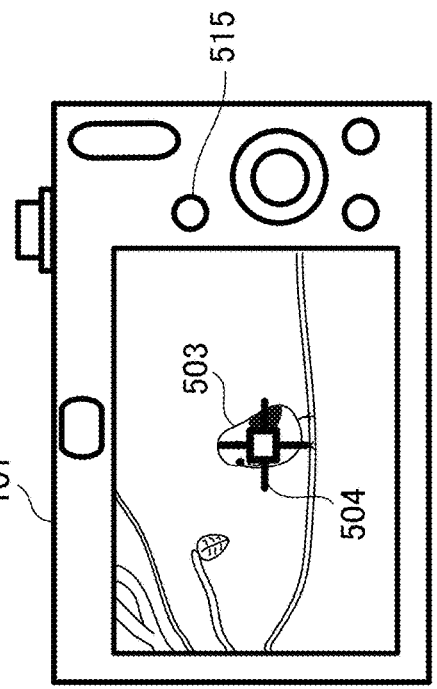
FIGS. 5A to 5C are diagrams for describing a subject designation method of the tracking control of the first embodiment.
Figure 5A:
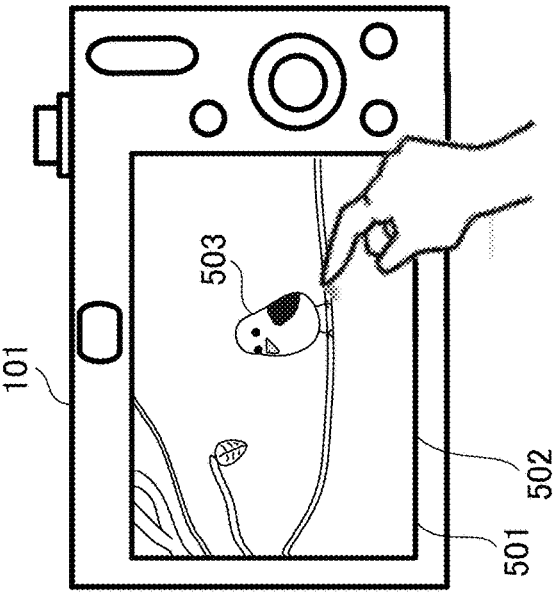

When subject tracking is performed, a photographer can designate a subject within a screen in order to photograph a desired subject. A subject designation method for tracking will be described by way of a specific example of FIGS. 5A to 5C. FIG. 5A illustrates an example in which a touch panel 502 is provided on a liquid crystal display (LCD) 501 provided on a rear surface of the imaging apparatus 101. When a photographer touches on a display screen, a process of acquiring the coordinate of a subject 503 at the touched position and setting a tracking target subject is executed. Moreover, FIG. 5B illustrates an example in which an operation SW (switch) 505 for setting a tracking subject selectable mode (hereinafter referred to as a tracking selectable mode) is provided. When the photographer presses the operation SW 505, the operation mode enters into a tracking selectable mode. Since an icon 504 for designating a subject is displayed at the center of the screen, the photographer can set the subject 503 at the display position of the icon 504 as a tracking target subject by operating the SW1 of the release switch 104, for example.

Figure 5C:
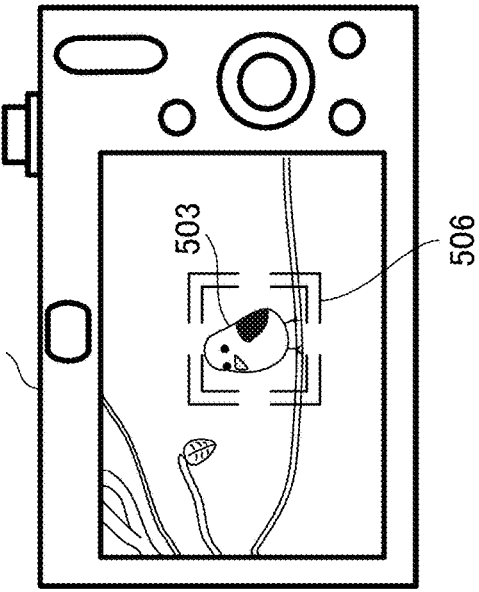

In any of the methods illustrated in FIGS. 5A and 5B, when a subject is designated, a process of detecting a region having a similar feature amount from images sequentially obtained thereafter using the feature amount such as a hue distribution or a hue size is performed. FIG. 5C illustrates an example in which a main subject region extracted as a region having a similar feature amount is presented to a photographer as a tracking region indicated by a frame 506. When a photographer designates a subject image within a display screen to track a subject, the following problems may occur before the subject is designated.

For example, when the focal distance of a lens is as large as 1000 mm or larger, a subject image may move due to the influence of a handshake and it may be difficult to capture a subject within an angle of view to perform framing. In order to alleviate the difficulty of framing due to the influence of a hand shake, a method of changing characteristics so as to decrease the thrust toward the center of the control range of the offset subtractor 110 or decreasing the cutoff frequency of the integral filter unit 111 to increase a blur correction control range may be used. However, when the shake suppression characteristics for hand shake correction are enhanced, image blur correction is performed on the hand shake amount occurring when the photographer operates the camera intentionally even when a photographer operates a camera so that the subject falls within the angle of view. Therefore, due to the influence of the image blur correction control, it may be difficult to capture a subject within the angle of view again or finely adjust the subject image to be positioned near the center of a photographed image. For example, before a photographer designates a subject in a state in which the operation mode is set to a tracking selectable mode by the photographer operating the operation SW 505 in FIG. 5B, it is necessary to allow the photographer to perform framing easily so that the icon 504 is moved to the position of the subject 503 in order to set a tracking target subject, for example. When the operation mode is set to the tracking selectable mode, the shake suppression characteristics for blur correction are enhanced more than that when the tracking selectable mode is not set. In this case, since the photographer is less likely to perform panning greatly in the state in which the tracking selectable mode is set, the panning determination unit 113 increases the determination threshold. In this way, the photographer can easily perform panning so that the icon 504 is positioned at the position of the subject 503.

After the subject is designated, correction for capturing a subject image at a specific position (for example, the central position) within a photographed image by tracking control is performed simultaneously with image blur correction. In this case, shake suppression characteristics associated with image blur correction are enhanced to suppress the influence of a hand shake as much as possible. In this case, the shake suppression characteristics are enhanced further than that before the subject is designated. When tracking of the designated subject starts, since the photographer is still less likely to perform panning greatly, the panning determination unit 113 increases the determination threshold to be larger than that before the subject is designated.

In the following description, a default state in which the tracking selectable mode is not set will be referred to as a first state, and a state in which the tracking selectable mode is set, the subject is not selected, and the tracking SW 121 is in the OFF state will be referred to as a second state. A state in which the tracking selectable mode is set, the subject is selected, and the tracking SW 121 is in the ON state will be referred to as a third state (a tracking mode setting state). The image blur correction effect in the second state is stronger than the image blur correction effect in the first state. Also, the image blur correction effect in the third state is stronger than the image blur correction effect in the second state. The cutoff frequency of the integral filter unit 111 in the first state will be denoted by fc1 and a panning determination threshold will be denoted by Ah1. The cutoff frequency of the integral filter unit 111 in the second state will be denoted by fc2 and a panning determination threshold will be denoted by Ah2. The cutoff frequency of the integral filter unit 111 in the third state will be denoted by fc3 and a panning determination threshold will be denoted by Ah3. The cutoff frequencies and the panning determination thresholds satisfy the following relations represented by Expressions (2) and (3).

$$fc1 > fc2 > fc3 \quad (2)$$

$$Ah1 < Ah2 < Ah3 \quad (3)$$

The degree of the image blur correction effect changes from the first state in which the tracking selectable mode is not set to the second state in which a tracking operation is not performed, and to the third state in which the tracking operation is performed. Therefore, it is possible to perform optimal image blur correction control when designating a subject and tracking the subject and to perform photographing while smoothly tracking the subject.

Next, a process of changing the degree of the image blur correction effect according to a subject detection position will be described. When a trackable range of the subject tracking control is sufficient, tracking control is performed so that the subject image is moved near the center of a screen. However, since the trackable range is limited, further tracking control cannot be performed when a control position reaches the end (limit position) of the trackable range.

In that case, the photographer performs framing of the camera so that the subject image is moved near the center of the screen. In this case, when image blur correction is performed on a hand shake amount occurring when the photographer operates the camera intentionally, an adverse effect may occur in correction. That is, it may be difficult for the photographer to capture a subject within the angle of view again or finely adjust the position of a subject image to be positioned at the center of a photographed image. Therefore, in the present embodiment, a process of changing the cutoff frequency (fc4) of the integral filter unit 111 according to a subject detection position detected by the subject detection unit 117 is performed. A process example will be described with reference to FIG. 6.

Figure 6:
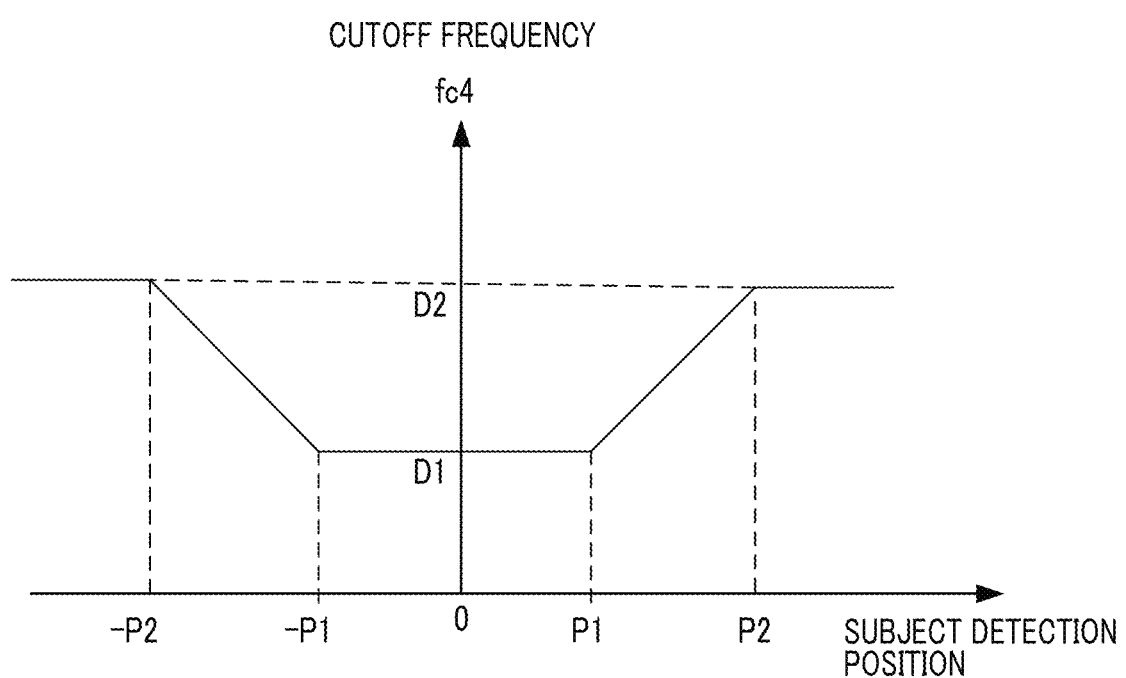
FIG. 6 is a diagram for describing setting of a blur prevention cutoff frequency according to a subject position according to the first embodiment.

FIG. 6 illustrates a graph illustrating setting the cutoff frequency fc4 (vertical axis) according to a subject detection position (horizontal axis). The coordinate of a subject detection position is detected in the two axial directions of the vertical and horizontal directions of the screen. With regard to lens control, the cutoff frequency fc4 of the integral filter unit 111 corresponding to the pitch control in the vertical direction and the yaw control in the horizontal direction is set. Moreover, it is assumed that the subject detection position indicates the position of a subject in a coordinate in which the central position (the target position) of an angle of view is set to zero.

FIG. 6 illustrates a table having such characteristics that the farther the subject position located away from the central position of the angle of view, the larger the cutoff frequency fc4. P1 and P2 are thresholds of a positive-value range and −P1 and −P2 are thresholds of a negative-value range. When the subject detection position is within the range from −P1 to +P1, the cutoff frequency fc4 is set to a default value D1. When the subject detection position is equal to or larger than P2 or equal to or smaller than −P2, the cutoff frequency fc4 is set to a frequency D2. Here, D2>D1. When the subject detection position is in a segment between P1 and P2 or a segment between −P1 and −P2, the cutoff frequency fc4 is set to a value calculated by linearly interpolating between D1 and D2 using a linear equation.

The blur prevention characteristics changing unit 112 compares the calculated cutoff frequency fc4 with the cutoff frequency of the integral filter unit 111 which has been determined according to the tracking selectable mode and the state of the tracking SW 121. As a result of comparison, the higher cutoff frequency is set as a final cutoff frequency of the integral filter unit 111.

By changing the cutoff frequency of the integral filter unit 111 according to the subject position in this manner, the image blur correction effect when the subject image is positioned near the center of the screen is enhanced, and it is possible to prevent the subject image from deviating from the center of the screen due to the influence of a hand shake. Moreover, when the subject image is away from the center of the screen, a state in which it is not possible to move the subject image to the center of the screen by tracking control (a state in which the trackable range is near a control end, for example) is created. The control end is a position at which the realization of correction is limited. In this case, the image blur correction effect is slightly weakened so that a photographer can move the subject image to be positioned near the center of the screen by framing. That is, it is possible to prevent image blur correction from being performed by framing of the photographer and to facilitate framing.

Figure 7:
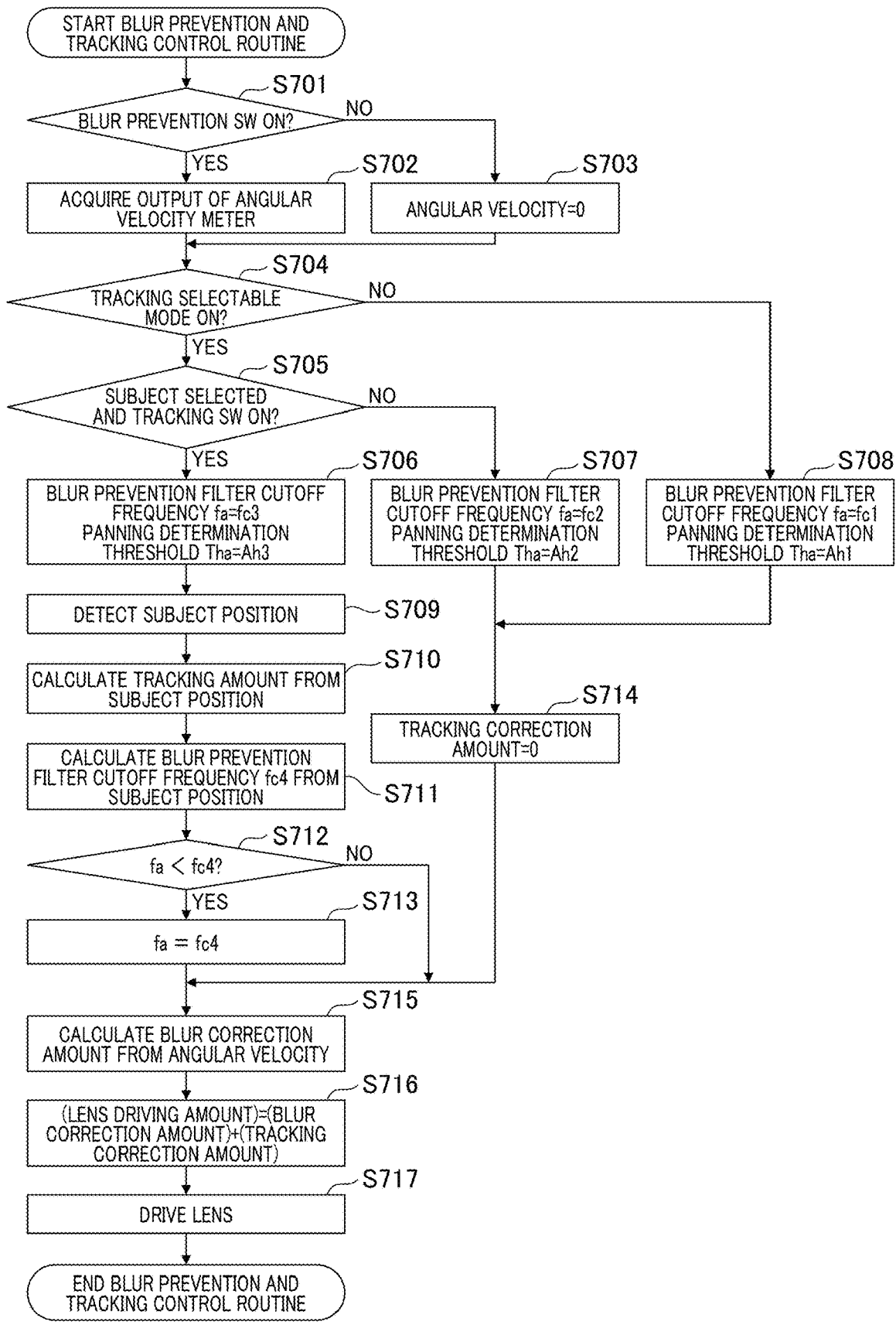
FIG. 7 is a flowchart for describing the control according to the first embodiment.

A process example of the blur correction control and the subject tracking control will be described with reference to the flowchart illustrated in FIG. 7. The following process starts when a main power supply of the imaging apparatus 101 is turned on and is executed at a fixed sampling cycle.

First, in S710, the CPU 105 determines whether a blur prevention SW (switch) is in the ON state. The blur prevention SW is an operation switch indicating whether the user performs image blur correction control. When the blur prevention SW is in the ON state, the flow proceeds to S702. When the blur prevention SW is in the OFF state, the flow proceeds to S703. In S702, the CPU 105 acquires the output of the angular velocity meter 103 and the flow proceeds to S704. In S703, the output of the angular velocity meter 103 is not acquired, and the flow proceeds to S704 after the angular velocity is set to zero. When the angular velocity is set to zero, a subsequent blur correction calculation result (that is, a blur correction amount) becomes zero.

In S704, the CPU 105 determines whether the tracking selectable mode is set to ON. For example, it is determined whether the tracking selectable mode is set to ON by the operation SW 505 in FIG. 5B. When the tracking selectable mode is set to ON, the flow proceeds to S705. When the tracking selectable mode is set to OFF, the flow proceeds to S708. In S705, the CPU 105 determines whether the tracking SW 121 is in the ON state. Whether the tracking SW 121 is in the ON or OFF state can be determined based on whether a subject is selected by the method described in FIGS. 5A to 5C, for example. When the tracking SW 121 is in the ON state, the flow proceeds to S706. When the tracking SW 121 is in the OFF state, the flow proceeds to S707.

In S706, the cutoff frequency (denoted by fa) of the integral filter unit 111 is set to fc3. Moreover, The panning determination unit 113 sets the panning determination threshold (denoted by Tha) to Ah3 and the flow proceeds to S709. In S709, the subject detection unit 117 detects a subject position in a photographed image. In this example, it is assumed that at the time point at which the tracking SW 121 is set to ON in S705, a subject image on the LCD screen on which a captured image is displayed in a live view is designated by a user's operation. That is, the imaging apparatus 101 recognizes the subject and acquires the coordinate of the detection position of the subject by tracking and detecting the subject.

Subsequently, in S710, the tracking amount calculation unit 118 calculates a tracking correction amount from the detected subject position and the flow proceeds to S711. In S711, the CPU 105 calculates the cutoff frequency fc4 of the integral filter unit 111 based on the detected subject position. In S712, the CPU 105 determines whether the current cutoff frequency fa is smaller than fc4. When fa<fc4, the flow proceeds to S713. When fa≥fc4, the flow proceeds to S715. In S713, the CPU 105 substitutes the value fc4 into fa, and the flow proceeds to S715.

In S708, the CPU 105 sets the cutoff frequency fa of the integral filter unit 111 to fc1. The panning determination unit 113 sets the panning determination threshold Tha to Ah1 and the flow proceeds to S714. In S707, the CPU 105 sets the cutoff frequency fa of the integral filter unit 111 to fc2. The panning determination unit 113 sets the panning determination threshold Tha to Ah2 and the flow proceeds to S714. After the tracking correction amount is set to zero in S714, the flow proceeds to S715.

In S715, the blur correction angle calculation unit 109 calculates a blur correction amount. In this case, the angular velocity acquired in S702 or S703, and the cutoff frequency fa of the integral filter unit 111 and the panning determination threshold Tha of the panning determination unit 113 set in S705 to S703 are used. After the blur correction amount is calculated, the flow proceeds to S716. In S716, the adder 115 adds the blur correction amount and the tracking correction amount to calculate a lens driving amount. Subsequently, in S717, the CPU 105 controls the driving of the correction lens 108 based on the lens driving amount with the aid of the driving control unit 116. In this way, image blur correction and subject tracking control are performed. When the image blur correction process and the subject tracking control process end, a standby is performed until a subsequent sampling time point arrives.

An image position control device of the present embodiment calculates a subject tracking amount based on a subject position in a photographed image. The subject tracking amount is a control amount for moving a subject image to be positioned at a specific position (for example, the central position or a position designated by a user) within a screen. Moreover, the image position control device performs calculation based on an angular velocity output as a blur detection signal to calculate a blur correction amount (image blur correction amount). The blur correction amount and the subject tracking amount are added and image blur correction and subject tracking control are performed by controlling the driving of a correction lens based on the added value. In this case, the characteristics of calculating the blur correction amount are changed according to a control state of the subject tracking. That is, a process of changing the degree of an image blur correction effect based on determination result information indicating whether the tracking selectable mode is set and the ON/OFF setting information of the tracking switch and a process of changing the degree of an image blur correction effect according to the subject position are performed. Therefore, it is possible to realize image blur correction control which allows a photographer to easily perform panning, and to improve the performance of the image blur correction control and the automatic subject tracking control.

In the present embodiment, an application example to so-called optical blur prevention control in which a correction lens is used as an image blur correction and automatic subject tracking control unit and is moved within a plane vertical to an optical axis has been described. However, the present invention can be applied to an image position control device having the following configurations.

(1) A configuration for moving an imaging element within a plane vertical to an optical axis.

(2) A configuration in which electronic control is performed by image processing for changing a slicing position of photographic frames output by an imaging element.

(3) A configuration having a mechanism for rotating a lens barrel including an imaging element and a photographing lens group.

(4) A configuration combined with a driving mechanism (for example, a rotary pan head for performing panning or tilting of an imaging apparatus) provided separately from the imaging apparatus.

(5) A combination of a plurality of configurations described in (1) to (4).

This is also true for a third embodiment to be described later.

Second Embodiment

Next, a second embodiment of the present invention will be described. In the present embodiment, image blur correction and automatic subject tracking when a mechanism for rotating a lens barrel including a photographing lens group and the imaging element 106 as well as the correction lens 108 is included will be described. In the present embodiment, the same constituent elements as those of the first embodiment will be denoted by the previously used reference numerals, the detailed description thereof will not be provided and the difference will be mainly described. The same is true for the embodiments to be described later.

Figure 8A:
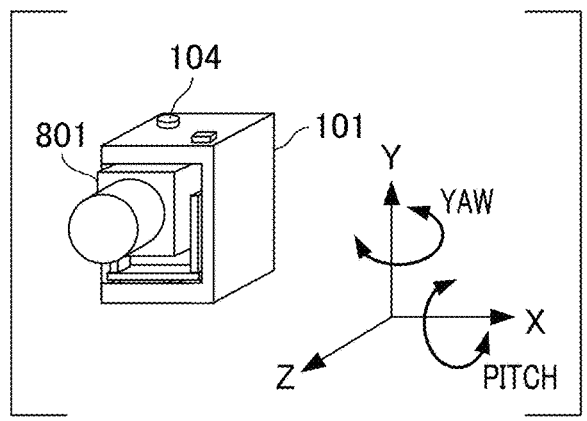
FIGS. 8A and 8B are diagrams schematically illustrating an imaging apparatus according to a second embodiment.
Figure 8B:
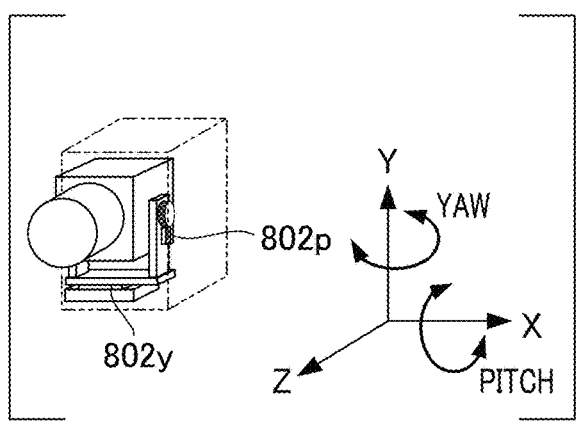

FIGS. 8A and 8B are diagrams schematically illustrating an imaging apparatus 101 according to the present embodiment. In FIGS. 8A and 8B, among the X, Y, and Z-axes of a three-dimensional orthogonal coordinate system, a direction around the X-axis is defined as a pitch direction and a direction around the Y-axis is defined as a yaw direction. The Z-axis direction is the optical axis direction of the imaging apparatus 101. The imaging apparatus 101 illustrated in FIG. 8A includes an operating member such as the release switch 104 and a display unit that displays a photographed image. The display unit which uses an LCD or the like has a monitor function of displaying a photographed image in a live view on a realtime basis. A lens barrel 801 includes a photographing lens group and the imaging element 106 and is attached in a state of being drivable by the imaging apparatus 101. That is, a mechanism for rotating (tilting) the lens barrel 801 in relation to the imaging apparatus 101 is provided.

FIG. 8B illustrates a structure associated with rotation of the lens barrel 801. A driving mechanism 802$p$ includes a motor that rotates the lens barrel 801 in the pitch direction and a driving control unit thereof. A driving mechanism 802$y$ includes a motor that rotates the lens barrel 801 in the yaw direction and a driving control unit thereof. The attitude of the lens barrel 801 can be controlled in the pitch direction and the yaw direction independently by the driving mechanisms 802$p$ and 803$y$.

Figure 9:
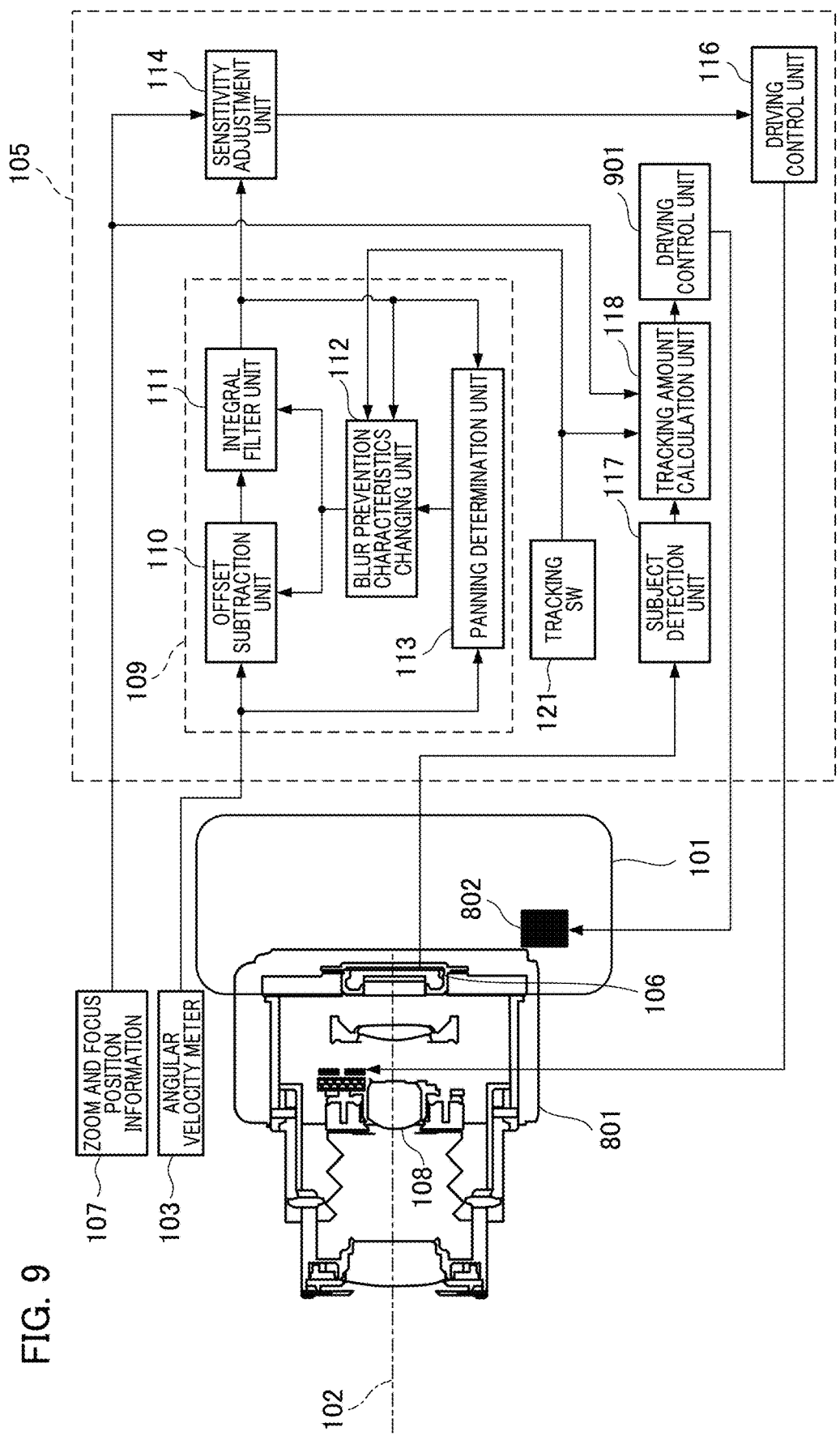
FIG. 9 is a diagram illustrating a configuration example of the imaging apparatus according to the second embodiment.

FIG. 9 is a diagram illustrating a configuration of a main part of the imaging apparatus 101. A difference between this configuration and the configuration of the first embodiment described in FIG. 2 will be described below.

(1) The rotation driving mechanism 802 for rotating the lens barrel 801 using a motor is provided.

(2) The adder 115 that adds the blur correction amount and the tracking correction amount is removed, and the blur correction amount output by the sensitivity adjustment unit 114 is input to the driving control unit 116.

(3) A driving control unit 901 for driving the rotation driving mechanism 802 is added and the tracking correction amount output by the tracking amount calculation unit 118 is input to the driving control unit 901.

(4) The driving control unit 901 performs automatic subject tracking control by driving the rotation driving mechanism 802 based on the tracking correction amount calculated by the tracking amount calculation unit 118.

The image position control device of the present embodiment performs image blur correction using the correction lens 108 and performs automatic subject tracking control using the rotation driving mechanism 802. In this case, the same advantages as those of the first embodiment are obtained, and it is possible to perform image blur correction control which allows the photographer to easily perform framing.

In the present embodiment, the angular velocity meter 103 is attached to the lens barrel 801 or is attached to a portion of the imaging apparatus 101 other than the lens barrel 801. When the angular velocity meter 103 is attached to the lens barrel 801, a relative angular velocity of the lens barrel 801 in relation to a fixing portion of the imaging apparatus 101 is subtracted from the output of the angular velocity meter 103. The relative angular velocity between the imaging apparatus 101 and the lens barrel 801 is a rotating velocity of the lens barrel 801 rotated by the rotation driving mechanism 802 and is detected based on a driving instruction signal of a motor or by a rotation detection sensor or the like. By subtracting the relative angular velocity from the output of the angular velocity meter 103, it is possible to calculate a shake amount of the imaging apparatus 101.

In the present embodiment, a correction lens and a driving mechanism thereof are used as an image blur correction unit, and the lens barrel 801 including an imaging element and a photographing lens group and a rotation driving mechanism thereof are used as an automatic subject tracking unit. The present invention is not limited thereto, and the following configuration can be applied.

(1) A configuration including a mechanism for moving an imaging element within a plane vertical to an optical axis and a mechanism for driving a correction lens.

(2) A configuration including a processing unit that changes an image slicing position of respective photographic frames output by an imaging element and a mechanism for driving a correction lens.

(3) A configuration including a processing unit that changes an image slicing position of respective photographic frames output by an imaging element and a mechanism for moving the imaging element within a plane vertical to an optical axis.

(4) A configuration including a mechanism for moving an imaging element within a plane vertical to an optical axis and a mechanism for rotating a lens barrel including a photographing lens group.

(5) A configuration including a processing unit that changes an image slicing position of respective photographic frames output by an imaging element and a mechanism for rotating a lens barrel including a photographing lens group.

(6) A combination of a plurality of configurations described in (1) to (5).

Third Embodiment

Next, a third embodiment of the present invention will be described. An image blur correction and automatic subject tracking device of the present embodiment changes the characteristics of image blur correction based on subject detection information used for automatic subject tracking. The subject detection information is information indicating a subject detection state such as whether a subject is being detected or the subject has been lost and is information on reliability of subject detection. Hereinafter, image blur correction and automatic subject tracking control which takes the subject detection information into consideration will be described.

Figure 10:
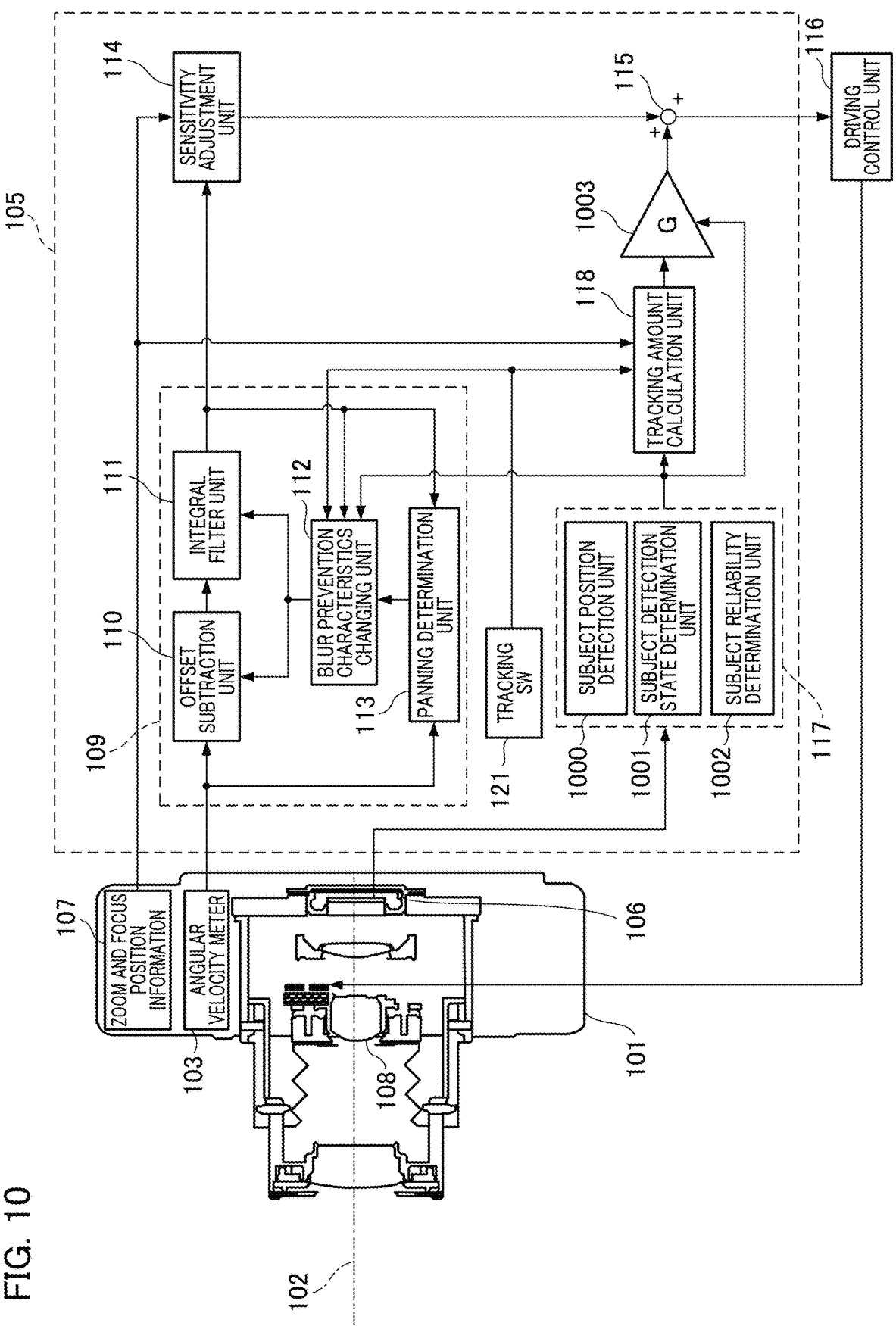
FIG. 10 is a diagram illustrating a configuration example of an imaging apparatus according to a third embodiment.

FIG. 10 is a diagram illustrating a configuration of a main part of an imaging apparatus according to the present embodiment. A difference between this configuration and the configuration of the first embodiment described in FIG. 2 will be described below.

(1) The subject detection unit 117 includes a subject detection state determination unit 1001 and a subject reliability determination unit 1002 in addition to a subject position detection unit 1000, and detection information and determination information are input to a tracking gain unit 1003, the blur prevention characteristics changing unit 112, and the tracking amount calculation unit 118.

(2) The tracking gain unit 1003 is added, and a gain is multiplied with the tracking correction amount which is the output of the tracking amount calculation unit 118 and the multiplied tracking correction amount is input to the adder 115.

The items of determination information obtained by the subject detection state determination unit (hereinafter referred to as a detection state determination unit) 1001 and the subject reliability determination unit (hereinafter referred to as a reliability determination unit) 1002 are input to the tracking gain unit 1003, and the tracking gain unit 1003 sets a gain according to the respective determination results. The gain is set to 0 or more and 1 or smaller. The tracking gain unit 1003 and the blur prevention characteristics changing unit 112 will be described in detail below.

The subject position detection unit 1000 corresponds to the subject detection unit 117 of the first embodiment and detects a subject position using face detection or pattern matching, for example. The detection state determination unit 1001 determines whether the subject is in a first detect state or a second detect state. The first detect state is a state in which a subject has been detected. The second detect state is a state (subject lost state) in which a subject is not detected because the subject is lost. The state can be determined based on whether the subject position detection unit 1000 has succeeded in detection, for example.

Since the tracking control can be performed in the first detect state, the tracking gain unit 1003 sets the gain to 1. That is, the tracking correction amount calculated by the tracking amount calculation unit 118 is input to the adder 115 as it is. Moreover, since subject tracking control is performed, the image blur correction effect is enhanced. As described in the first embodiment, the characteristics of the offset subtractor 110 and the integral filter unit 111 are set according to the state of the tracking SW 121 and the determination result of the panning determination unit 113, and the blur correction amount is calculated.

On the other hand, when the detection state determination unit 1001 has determined that the subject is in the second detect state, it is preferable to perform control to stop subject tracking. That is, when it is determined that the subject is in the second detect state, it is preferable to set the gain to 0. Moreover, the detection state determination unit 1001 may determine a subject detection state from three or more states rather than the two states of the first and second detect states. For example, the first detect state is defined as a state in which it is highly likely that the subject has been detected, and the second detect state is defined as a state in which it is highly likely that the subject has not been detected. Moreover, the third detect state is a state in which it is less likely that the subject has been detected than the first detect state and it is more likely that the subject has been detected than the second detect state. For example, during a predetermined period of time, the detection state determination unit 1001 detects a state in which is lost but continues to search for the subject (third detect state) and if it detects a subject again during the subject lost state, shifts to the first state, which is the subject detection again state. When the subject lost state continues for a predetermined period of time, the detection state determination unit 1001 shifts the second state, which is a subject non-detection state, after stopping the search for the subject. For example, the third state may be set so that the possibility of the object being detected by the elapsed time from when the subject was lost. In this case, the tracking gain unit 1003 sets the gain to 1 when the subject is in the first detect state, sets the gain to 0 when the subject is in the second detect state, and sets the gain to a value larger than 0 and smaller than 1 when the subject is in the third detect state.

The detection state determination unit 1002 may determine a detection state from a plurality of states set according to the possibility that the subject is detected between the first and second detect states. In this case, the tracking gain unit 1003 sets the gain so as to gradually decrease as the possibility that the subject is detected decreases and finally reach zero. Since tracking control is not performed in the second detect state, it is set such that the subject image can be moved to be positioned near the center of the screen by the framing operation of the photographer. That is, the blur prevention characteristics changing unit 112 slightly weakens the image blur correction effect, prevents image blur correction from being performed on a framing operation, and changes the blur prevention characteristics so that the photographer can easily perform framing. In this case, the blur prevention characteristics facilitate framing while maintaining the image blur correction effect to a certain strength.

The cutoff frequency of the integral filter unit 111 is set to fc2 and the panning determination threshold is set to Ah2. This setting is the same as that when the subject is not designated and the tracking SW is in the OFF state illustrated in S707 of FIG. 7. The blur prevention characteristics changing unit 112 changes the blur prevention characteristics according to the determination result on the subject detection state obtained by the detection state determination unit 1001, the state of the tracking SW 121, and the determination result of the panning determination unit 113. That is, the blur prevention characteristics which best decrease the image blur correction effect are determined among the blur prevention characteristics corresponding to the determination result on the subject detection state and the blur prevention characteristics corresponding to the state of the tracking SW 121 and the determination result of the panning determination unit 113. The offset subtractor 110 and the integral filter unit 111 are set according to the determined blur prevention characteristics.

The reliability determination unit 1002 determines whether the detected subject is reliable. The reliability of the subject can be determined based on the size of a subject image in a photographed image, for example. Alternatively, the reliability of a main subject which is a determination target can be calculated based on the degree of matching between the pattern of a subject image stored when designating a subject and the detected subject image. Moreover, since it is highly likely that a false main subject has been detected even when there are a plurality of subjects having the same pattern as the detected subject, the reliability is calculated to be low. The reliability determination unit 1002 compares the calculated reliability with a threshold to determine whether the detected subject is reliable. When the reliability of the subject is high (equal to or higher than the threshold), subject tracking control can be performed. In this case, the tracking gain unit 1003 sets the gain to 1. The tracking correction amount calculated by the tracking amount calculation unit 118 is input to the adder 115 as it is. In order to increase the image blur correction effect during the tracking control, the characteristics of the offset subtractor 110 and the integral filter unit 111 are changed and the blur correction amount is calculated.

On the other hand, when the reliability determination unit 1002 determines that the reliability of the subject is smaller than the threshold and the reliability is low, control is performed to stop tracking since it is likely that the tracking control may be undesired by the photographer. The reliability determination unit 1002 preferably evaluates the reliability in multiple steps using a plurality of thresholds rather than evaluating whether the reliability is reliable using the same threshold in two steps. In this case, when the calculated reliability is equal to or higher than the largest threshold (the reliability is evaluated to be the highest), the tracking gain unit 1003 sets the gain to 1 and gradually decreases the gain according to the reliability. Moreover, when the reliability is smaller than the smallest threshold, the gain is finally set to zero. In this case, the blur prevention characteristics are changed to slightly weaken the image blur correction effect. That is, the cutoff frequency of the integral filter unit 111 is set to fc2 and the panning determination threshold is set to Ah2. In this case, the blur prevention characteristics facilitate framing while maintaining the image blur correction effect to a certain strength. The blur prevention characteristics changing unit 112 changes the blur prevention characteristics according to the determination result of the reliability determination unit 1002, the determination result on the subject detection state obtained by the detection state determination unit 1001, the state of the tracking SW 121, and the determination result of the panning determination unit 113. That is, the blur prevention characteristics corresponding to the subject reliability which is the determination result of the reliability determination unit 1002, the blur prevention characteristics corresponding to the subject detection state, and the blur prevention characteristics corresponding to the state of the tracking SW 121 and the determination result of the panning determination unit 113 are compared. Among these blur prevention characteristics, the blur prevention characteristics which best decrease the image blur correction effect are determined. The offset subtractor 110 and the integral filter unit 111 are set according to the determined blur prevention characteristics.

The tracking correction amount output from the tracking gain unit 1003 is input to the adder 115 and is added to the target value of the blur correction amount which is the output of the sensitivity adjustment unit 114. In this way, tracking correction and image blur correction can be performed simultaneously by driving the correction lens 108.

In the present embodiment, the characteristics of image blur correction are changed according to the subject detection state or the subject reliability or both. Therefore, since it is possible to realize image blur correction control which allows the photographer to easily perform framing, it is possible to improve the performance of the image blur correction and automatic subject tracking control.

Fourth Embodiment

Next, a fourth embodiment of the present invention will be described. An image blur correction and automatic subject tracking device according to the present embodiment determines whether tracking control can be performed based on subject detection information used for automatic subject tracking and displays a determination result on the screen of a display unit. In this way, it is possible to notify whether the imaging apparatus can track a subject to the photographer and to realize image blur correction and subject tracking control which allows the photographer to easily perform framing.

In a system that tracks a subject so that the position of the subject is maintained at a specific position of a photographing screen, since during a tracking operation, the camera tracks a subject so that the subject is automatically positioned near the center of the angle of view by the tracking control, the photographer does not need to perform a framing operation to track the subject. However, such subject tracking is performed by moving a portion of an optical system, there is a limit in the trackable range. Since further tracking cannot be performed when the optical system reaches the end of the trackable range, the photographer needs to shake the camera to track the subject. However, since it is difficult for the photographer to immediately recognize that the optical system has reached the end of the trackable range, the photographer may lose the subject from the photographing screen due to a late framing operation. This may occur even when tracking is performed by changing the slicing range of a frame.

In the present embodiment, it is determined whether the camera can perform tracking control and the determination result is displayed on the screen of a display unit. In this way, it is possible to improve the operability of the photographer's framing operation.

Figure 11:
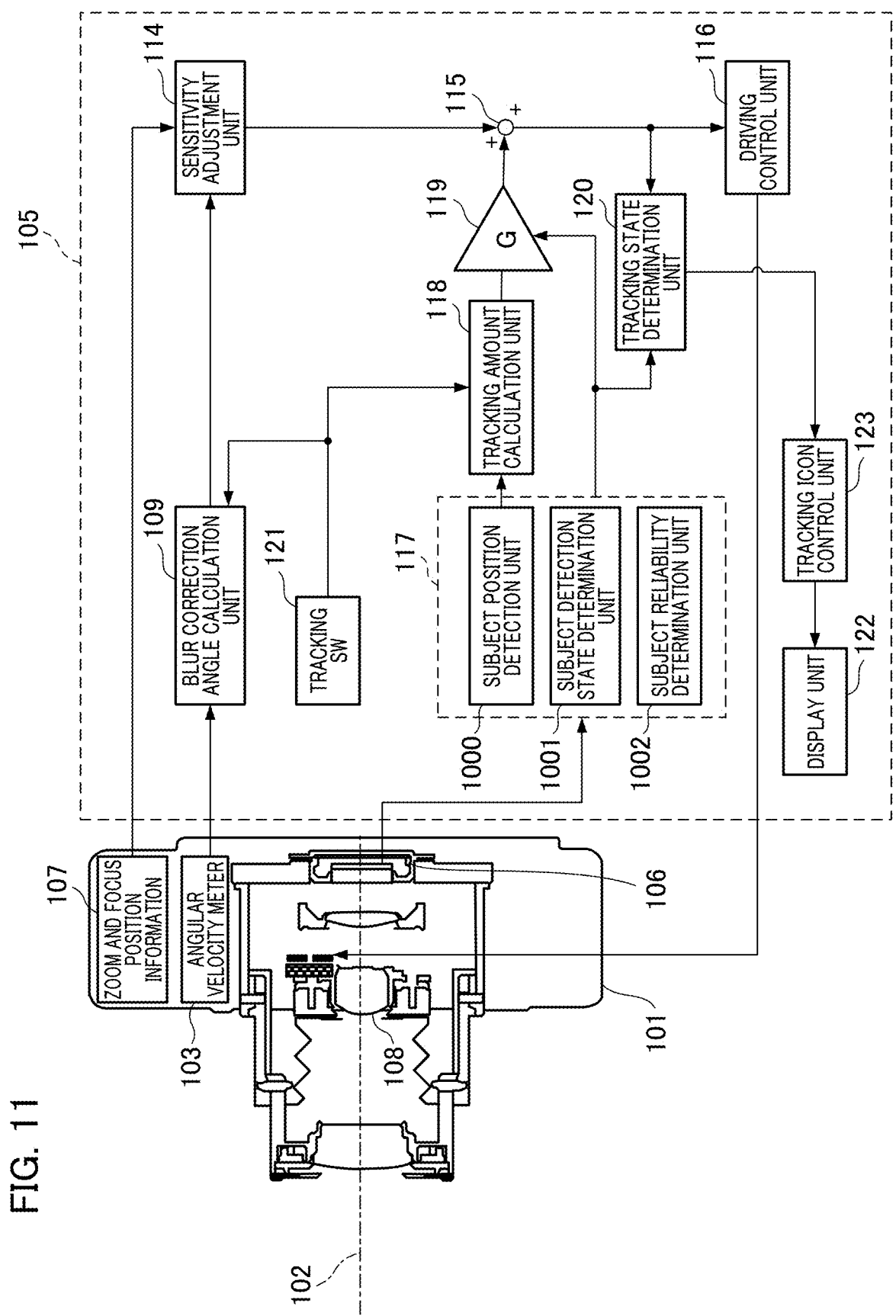
FIG. 11 is a diagram illustrating a configuration example of an imaging apparatus according to a fourth embodiment.

FIG. 11 is a diagram illustrating a configuration of a main part of an imaging apparatus according to the present embodiment. This configuration is different from the configuration described in FIG. 10 in the third embodiment in that this configuration includes a tracking state determination unit 120 and a tracking icon control unit 123. A determination result obtained by the tracking state determination unit 120 is input to the tracking icon control unit 123, and an icon to be displayed on the display unit 122 is controlled by the tracking icon control unit 123.

When subject tracking control is performed and the trackable range is sufficient, tracking control is realized so that the position of the subject is maintained to be near the center of the screen. However, since the trackable range is limited, further tracking control cannot be performed when the optical system reaches the end of the trackable range. In this case, the photographer needs to frame the camera again to move the subject to be positioned near the center. However, it is difficult for the photographer to immediately determine whether further tracking can be performed just by viewing a live-view image. Thus, the photographer may not perform framing again immediately after the correction lens 108 reaches the end of the trackable range, and the subject may be lost from the screen. Therefore, the imaging apparatus 101 of the present embodiment determines whether tracking control can be performed. Moreover, the tracking icon to be displayed on the screen is changed according to the determination result and the photographer is notified whether tracking can be performed. In this way, when tracking cannot be performed, a warning notification is issued to urge the photographer to perform an operation of tracking the subject by a framing operation.

Figure 12A:
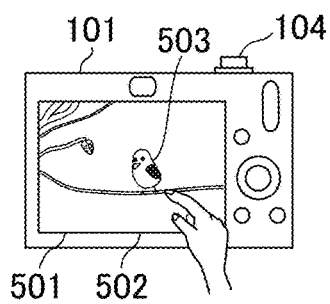
FIGS. 12A to 12H are diagrams illustrating the state of the imaging apparatus during tracking control according to the fourth embodiment and an example of a timing chart.

FIGS. 12A to 12H illustrate a camera rear view illustrating a subject tracking operation and the tracking state and timing charts illustrating the control state. When subject tracking is performed, in order for the photographer to photograph a desired subject, it is preferable for the photographer to designate a subject in the screen and perform tracking. As a method of designating a subject to be tracked, for example, as illustrated in FIG. 12A, a method of acquiring a coordinate position of a touched subject 503 with the aid of the touch panel 502 provided under the LCD 501 on the rear surface of the camera 101 and setting a tracking target subject may be used.

When a subject is designated by the method illustrated in FIG. 12A, a main subject region is tracked by detecting regions having a similar feature amount from images sequentially obtained thereafter by a live-view operation using the feature amount such as a hue distribution or a hue size. Moreover, the main subject region is depicted as a tracking region by the frame 506 to notify the photographer of the tracking region. After the subject is designated, tracking control is performed so that the detected subject position is moved toward the center of the screen. Moreover, a tracking icon 505 is displayed on the screen so that the photographer understands that the tracking control is performed. When subject tracking is not performed (the subject is not designated), the tracking icon 505 is not displayed on the screen.

Figure 12B:
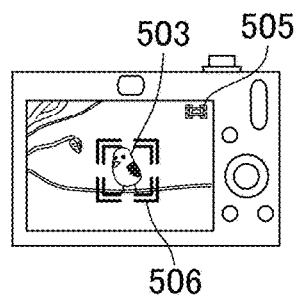
Figure 12C:
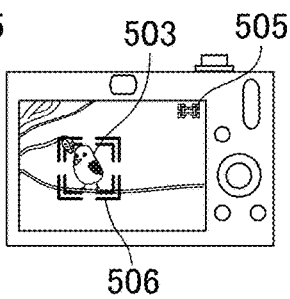
Figure 12D:
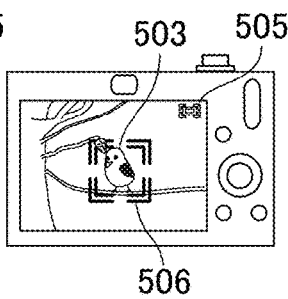
Figure 12E:
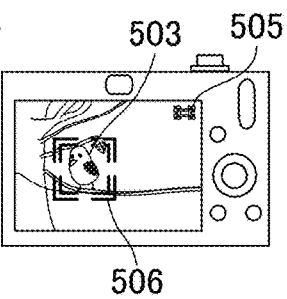
Figure 12F:
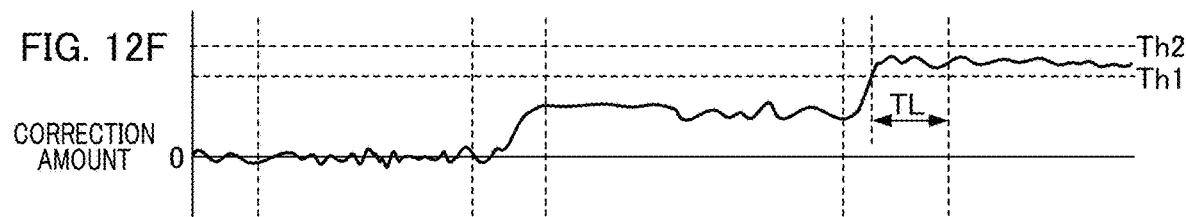
Figure 12G:
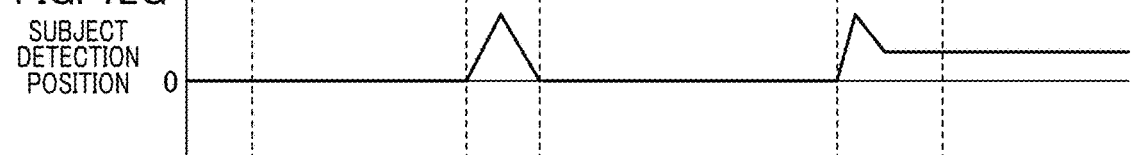
Figure 12H:
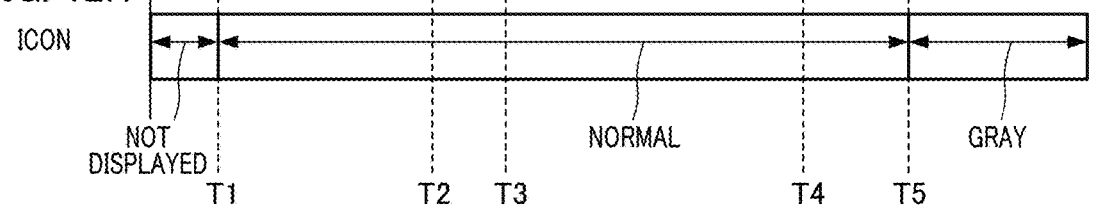

FIG. 12B is a diagram illustrating a state after the subject is designated. FIG. 12F illustrates the output of the adder 115 obtained by adding the blur correction amount and the tracking correction amount when the state of the screen displayed by the imaging apparatus 101 changes from FIG. 12A to FIG. 12B, FIG. 12C, FIG. 12D, and FIG. 12E according to the elapse of time. FIG. 12G illustrates a center shift amount which is the output of the subtractor 403 and FIG. 12H illustrates a display state of the tracking icon 505. When the subject position detection unit outputs the coordinate of the detected subject using the target position as a central coordinate, the output of the subject position detection unit can be regarded as a center shift amount. The tracking icon 505 is not displayed on the screen until timing T1 at which the subject is designated, and the tracking icon 505 is displayed on the screen when the subject is designated at timing T1 as illustrated in FIG. 12B. Subsequently, even when the subject 503 is away from the center of the image when the designated subject 503 moves (FIG. 12C), the tracking control is performed based on the tracking correction amount calculated by the tracking amount calculation unit 118 such that the subject 503 returns to the center of the image (FIG. 12D). In the drawings, T2 indicates the timing at which the subject moves away from the center of the image and T3 indicates the timing at which the subject returns to the center of the image by the tracking control.

Subsequently, although tracking control is performed while further increasing the tracking correction amount when the subject moves further, the tracking correction amount is limited so as not to exceed a correctable amount Th2 when the correction amount of the correction lens 108 reaches a trackable threshold Th1 as illustrated in FIG. 12F. In this case, the correction amount is set to be between Th1 and Th2, and the tracking icon 505 is displayed in gray at T5 at which a state in which the correction amount is equal to or larger than the threshold Th1 has continued for a predetermined period TL or more in order to notify the photographer of the fact that further tracking control cannot be performed. That is, the CPU 105 functioning as the tracking state determination unit and the tracking icon control unit determines that the tracking control cannot be performed when the state in which the correction amount is the threshold Th1 or more has continued for the predetermined period TL or more, displays the tracking icon 60 in gray, and issues a warning instruction to send a warning to the photographer. The correctable amount Th2 is an amount required for the correction lens to reach the end of the movable range and the trackable threshold Th1 can be appropriately set to a value smaller than Th2. For example, the trackable threshold Th1 may be set to a value obtained by multiplying the correctable amount Th2 by a coefficient larger than 0 and smaller than 1 and may be set to a value obtained by subtracting a fixed amount from the correctable amount Th2.

Since further tracking control cannot be performed when the correction lens 108 reaches the end of the movable range, the display of the tracking icon 505 is changed in the above-described manner to urge the photographer to frame the camera to move the subject toward the center of the image.

Next, another example of a method of sending a notification to the photographer by changing the tracking icon 505 when the correction lens 108 exceeds the trackable range and the tracking control cannot be performed will be described with reference to FIGS. 13A to 13H. A method of determining whether the tracking operation can be performed used in the example of FIGS. 13A to 13H is different from the example of FIGS. 12A to 12H. When it is not possible to move the position of the subject to the vicinity of the center of the image after the start of tracking control and the subject is positioned at the position away from the center for a long period, it can be determined that the tracking correction has reached the end of the movable range and further tracking control cannot be performed. In this case, a warning icon is displayed to notify the fact that tracking control cannot be performed.

Whether the tracking operation can be performed or not is determined in the following manner. That is, when a period in which a center shift amount which is the distance on an image between the subject position and the center of the image exceeds a predetermined threshold Th3 is equal to or longer than a predetermined period T7, it is determined that tracking cannot be performed. In other words, when a state in which the position of a subject image is separated by a predetermined distance or more from a target position has continued for a predetermined period or longer, it is determined that the subject cannot be tracked. Moreover, when the center shift amount is equal to or smaller than the threshold Th3, it is determined that tracking can be performed. This determination is performed by the tracking state determination unit 120. The tracking icon displayed on the screen is changed according to the determination result such that the photographer is notified of the information on whether tracking can be performed. When tracking cannot be performed, the photographer is urged to perform a framing operation to track the subject.

Figure 13A:
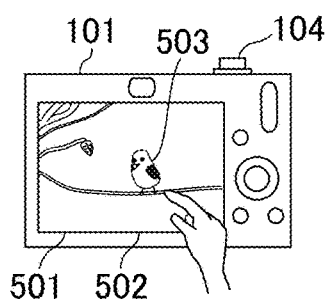
FIGS. 13A to 13H are diagrams illustrating an example of the state of the imaging apparatus during tracking control according to the fourth embodiment and an example of a timing chart.
Figure 13B:
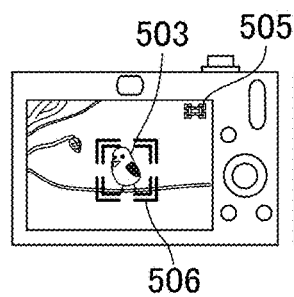
Figure 13C:
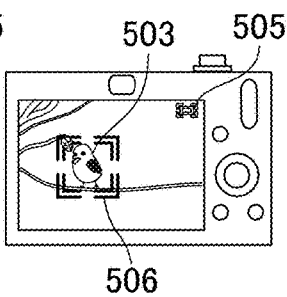
Figure 13D:
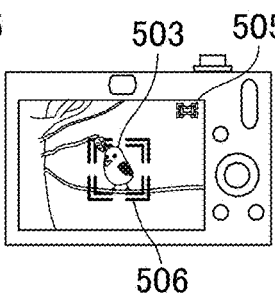
Figure 13E:
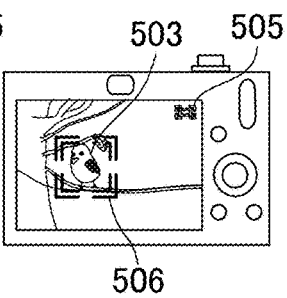
Figure 13F:
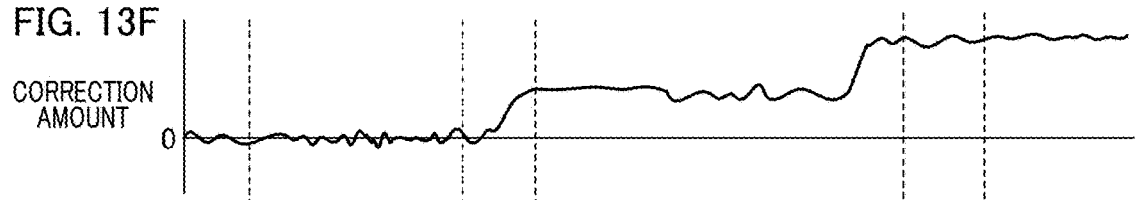
Figure 13G:
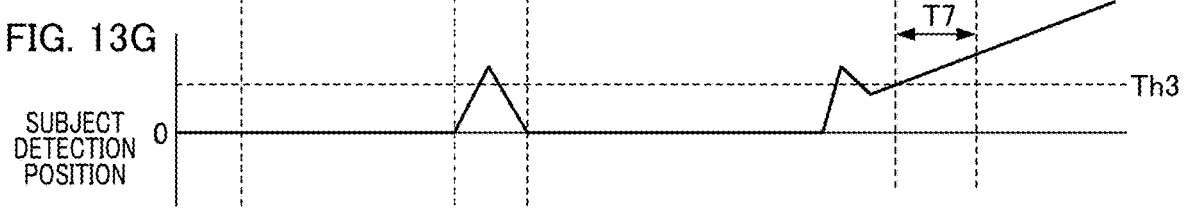
Figure 13H:
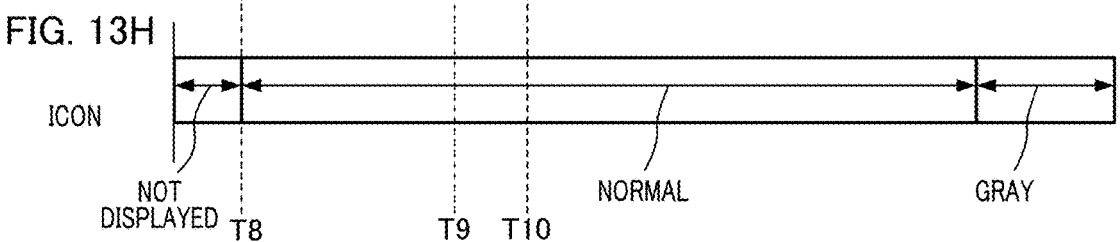

Similarly to the method described in FIG. 12A, when a subject is designated by a touch operation in FIG. 13A, the tracking control starts and the tracking icon 505 is displayed on the screen.

FIGS. 12B to 12E are diagrams illustrating the state after the subject is designated. FIG. 12F illustrates the output of the adder 115 obtained by adding the blur correction amount and the tracking correction amount when the state of the screen displayed by the imaging apparatus 101 changes from FIG. 12A to FIG. 12B, FIG. 12C, FIG. 12D, and FIG. 12E according to the elapse of time. FIG. 12G illustrates a center shift amount and FIG. 12H illustrates a display state of the tracking icon 505. The tracking icon 505 is not displayed on the screen until timing T8 at which the subject is designated, and the tracking icon 505 is displayed on the screen when the subject is designated at timing T8. Subsequently, even when the subject 503 is away from the center of the image when the designated subject 503 moves (FIG. 12C), the tracking control is performed based on the tracking correction amount calculated by the tracking amount calculation unit 118 such that the subject 503 returns to the center of the image (FIG. 12D). In the drawings, T9 indicates the timing at which the subject moves away from the center of the image and T10 indicates the timing at which the subject returns to the center of the image by the tracking control. Although the subject position exceeds the threshold Th3 in the period between T9 and T10, since the period in which the position exceeds Th3 does not exceed a predetermined period T7, the icon 505 is displayed in a normal color.

Subsequently, although tracking control is performed while further increasing the tracking correction amount when the subject moves further, the tracking icon 505 is displayed in gray in order to notify the photographer of the fact that further tracking control cannot be performed when a state in which the center shift amount is equal to or larger than the threshold Th3 as illustrated in FIG. 12G continues for the predetermined period T7 or longer.

In this manner, the CPU 105 functioning as the tracking state determination unit 120 determines that tracking has reached the end of the movable range and further tracking control cannot be performed when the subject position is away from the center of the image for a long period. Moreover, the CPU 105 also functions as the tracking icon control unit 123 and changes the display of the tracking icon 505 to urge the photographer to frame the camera to move the subject toward the center of the image.

In FIGS. 12A to 12H and FIGS. 13A to 13H, an example in which an icon is displayed when it is difficult to perform subject tracking control since the subject in the image moves a large distance and a correction amount for moving the subject position to the target position in the image is large has been described. However, tracking control may be difficult even when the correction amount is small. An example of a method of notifying the photographer by changing the display of the tracking icon 505 when tracking control cannot be performed due to a subject detection state will be described with reference to FIGS. 14A to 14H. When the reliability of the detected subject is low, it can be determined that tracking control cannot be performed. In this case, an icon is displayed to indicate that tracking control cannot be performed.

The reliability is determined by the subject reliability determination unit 1002 and it is determined whether the detected subject is reliable. Since the subject reliability determination by the subject reliability determination unit 1002 is the same as that of the third embodiment, the detailed description thereof will not be provided.

Similarly to the method described in FIG. 12A, when a subject is designated by a touch operation in FIG. 14A, tracking control starts and the tracking icon 505 is displayed on the screen.

FIG. 14B is a diagram illustrating a state after the subject is designated. FIG. 14E illustrates the output of the adder 115 obtained by adding the blur correction amount and the tracking correction amount when the state of the screen displayed by the imaging apparatus 101 changes from FIG. 14A to FIG. 14B, FIG. 14C, and FIG. 14D according to the elapse of time. Moreover, FIG. 14F illustrates a center shift amount, FIG. 14G illustrates the reliability of a subject, and FIG. 14H illustrates a display state of the tracking icon 505. The tracking icon 505 is not displayed on the screen until timing T11 at which the subject is designated, and the tracking icon 505 is displayed on the screen when the subject is designated at timing T11. Subsequently, even when the designated subject 503 is away from the center of the image, tracking control is performed based on the tracking correction amount calculated by the tracking amount calculation unit 118 such that the subject 503 returns to the center of the image as illustrated in FIG. 14B. In the drawings, T11 indicates the timing at which a subject is designated and the subject position is detected and T12 indicates the timing at which the subject returns to the center of the image by the tracking control.

Subsequently, as illustrated in FIG. 14C, although tracking control is performed while further increasing the tracking correction amount when the subject moves further, the reliability of the subject is set to be low when a plurality of similar subjects appear in the screen as illustrated in FIG. 14D. When the subject reliability decreases, the gain of the tracking gain unit 1003 is set to be small and tracking control is not performed. Therefore, as illustrated in FIG. 14G, when the subject reliability is equal to or smaller than a predetermined threshold Th4, the tracking icon 505 is displayed in gray to notify the photographer of the fact that further tracking control cannot be performed.

In this manner, the CPU 105 functioning as the tracking state determination unit 120 determines that tracking control cannot be performed when the subject reliability is low. Moreover, the CPU 105 also functions as the tracking icon control unit 123 and changes the display of the tracking icon 505 to urge the photographer to frame the camera to move the subject toward the center of the image.

Next, another example of a method of notifying the photographer by changing the display of the tracking icon 505 when tracking control cannot be performed due to a subject detection state will be described with reference to FIGS. 15A to 15H. Although tracking control is performed when a subject is detected after the subject is designated, the state transitions to a subject lost state when the photographer loses the subject. Although the state transitions to the subject detection state when the subject can be detected again in the subject lost state, it is determined that tracking control cannot be performed if the subject lost state continues for a predetermined period. In this case, an icon is displayed to notify the fact that the tracking control cannot be performed. Moreover, when the subject lost state continues for a still longer period, it is determined that there is no possibility to detect the subject again, subject detection is stopped, and the tracking icon 505 is not displayed. The subject detection state is determined by the subject detection state determination unit 1001 based on whether the subject is detected, the subject is lost, or the subject is not detected.

Similarly to the method described in FIG. 12A, when a subject is designated by a touch operation in FIG. 15A, tracking control starts and the tracking icon 505 is displayed on the screen.

FIG. 15B is a diagram illustrating a state after the subject is designated. FIG. 15E illustrates the output of the adder 115 obtained by adding the blur correction amount and the tracking correction amount when the state of the screen displayed by the imaging apparatus 101 changes from FIG. 15A to FIG. 15B, FIG. 15C, and FIG. 15D according to the elapse of time. Moreover, FIG. 15F illustrates a center shift amount, FIG. 15G illustrates the subject detection state, and FIG. 15H illustrates a display state of the tracking icon 505.

The tracking icon 505 is not displayed on the screen until timing T11 at which the subject is designated, and the tracking icon 505 is displayed on the screen when the subject is designated as illustrated in FIG. 15B. Subsequently, even when the designated subject 503 moves to be positioned away from the center of the image, tracking control is performed based on the tracking correction amount calculated by the tracking amount calculation unit 118 such that the subject 503 returns to the center of the image as illustrated in FIG. 15B. In the drawings, T15 indicates the timing at which a subject is designated and the subject position is detected and T16 indicates the timing at which the subject returns to the center of the image by the tracking control.

Subsequently, as illustrated in FIG. 15C, although tracking control is performed while further increasing the tracking correction amount when the subject moves further, as illustrated in FIG. 15D, when the tracking target subject moves behind another subject and disappears from the screen, the subject detection unit 117 (the subject position detection unit 1000) cannot detect the subject and the subject lost state is created (T17). The subject lost state is created for a predetermined period (T18) after the subject is lost, and the state can return to the subject detection state when the subject 503 is detected again in the subject lost state. When the predetermined period T18 has elapsed after the state transitions to the subject lost state, it is determined that the subject cannot be detected further and a subject detection stop state is created. When the subject detection stop state is created, the state does not transition to the subject detection state even when the subject 503 appears in the screen again. When the subject detection state is to be created in the subject detection stop state, the subject is designated again. Since there is a possibility to detect the subject again in the subject lost state, subject tracking control is continued for a predetermined period (T19) after the subject is lost. The subject tracking control is stopped after the predetermined period T19 is elapsed, and a last tracking correction amount obtained based on a last sampling data is held as the tracking correction amount which is the output of the tracking amount calculation unit 118. During the period until T18 has finished, the last tracking correction amount is maintained as the tracking correction amount, and when T18 has finished, the tracking control amount gradually approaches 0, and the correction lens is returned to a position at which the subject tracking control is not performed.

In the subject lost state (T18), the tracking icon 505 is displayed in gray to notify the photographer of the fact that tracking control cannot be performed. Moreover, when the period T18 has elapsed from the subject lost state and the subject detection is stopped, the display of the tracking icon 505 is stopped.

In this manner, the CPU 105 functioning as the tracking state determination unit 120 determines that the tracking control cannot be performed according to the subject detection state. Moreover, the CPU 105 also functions as the tracking icon control unit 123 changes the display of the tracking icon 505 (including stopping the display of the tracking icon) such that it is possible to urge the photographer to frame the camera to move the subject toward the center of the image and to set the tracking target subject again.

Next, an example of a method of sending a notification to the photographer by changing the tracking icon 505 when tracking control cannot be performed in a state in which the magnitude of the shake of the camera 101 exceeds a magnitude that can be corrected by image blur correction will be described with reference to FIGS. 16A to 16H. When the detected shake amount of the camera 101 is large, it is determined that the tracking control cannot be performed. In this case, an icon is displayed to indicate that tracking control cannot be performed.

Similarly to the method described in FIG. 12A, when a subject is designated by a touch operation in FIG. 16A, tracking control starts and the tracking icon 505 is displayed on the screen.

FIG. 16B is a diagram illustrating a state after the subject is designated. FIG. 16E illustrates the output of the adder 115 obtained by adding the blur correction amount and the tracking correction amount when the state of the screen displayed by the imaging apparatus 101 changes from FIG. 16A to FIG. 16B and FIG. 16C according to the elapse of time. Moreover, FIG. 16E illustrates a center shift amount, FIG. 16F illustrates the output of the angular velocity meter 103, FIG. 16G illustrates a blur correction angle which is the output of the blur correction angle calculation unit 109, and FIG. 16H illustrates a display state of the tracking icon 505.

The tracking icon 505 is not displayed on the screen until timing T11 at which the subject is designated, and the tracking icon 505 is displayed on the screen when the subject is designated as illustrated in FIG. 16B. Subsequently, even when the designated subject 503 is away from the center of the image, tracking control is performed based on the tracking correction amount calculated by the tracking amount calculation unit 118 such that the subject 503 returns to the center of the image as illustrated in FIG. 16B. In the drawings, T22 indicates the timing at which a subject is designated and the subject position is detected and T22 indicates the timing at which the subject returns to the center of the image by the tracking control.

Subsequently, when the shake amount of the imaging apparatus 101 increases, the angular velocity which is the output of the angular velocity meter 103 increases, and the blur correction angle calculated based on the output of the angular velocity meter also increases. In this case, when the blur correction angle exceeds a blur correction limit, the photographed image blurs and it is not possible to fill the subject 503 into a certain position as illustrated in FIG. 16C. The correction lens 108 cannot perform correction over a correction limit (Th5,−Th5). Thus, when the tracking state determination unit 120 determines that tracking control cannot be performed in the range between Th5 and −Th5 at T24, the tracking icon 505 is displayed in gray to notify the photographer of the fact that tracking control cannot be performed.

As a method of determining whether tracking cannot be performed since the shake amount is large, a method of making the determination based on the angular velocity output by the angular velocity meter 103 may be used. The tracking state determination unit 120 determines that tracking cannot be performed if a period in which the correction amount exceeds a threshold (Th6 or more or −Th6 or smaller) within a predetermined period T20 is equal to or larger than a predetermined period. The determination may be performed based on the number of times rather than the period. In this case, it is determined that tracking cannot be performed when the number of times the correction amount, detected at a predetermined sampling interval exceeds the threshold is equal to or larger than a predetermined number of times.

As another method of determining whether tracking cannot be performed since the shake amount is large, a method of making the determination based on the blur correction angle which is the output of the blur correction angle calculation unit 109 may be used. In this case, the tracking state determination unit 120 determines that tracking cannot be performed if a period or the number of times in which the correction amount exceeds a predetermined threshold (Th7 or more or −Th7 or smaller) within a predetermined period T21 is equal to or larger than a predetermined period or a predetermined number of times.

According to any one of these methods, it is possible to detect a state in which a large image blur continuously appears and it is difficult to perform image blur correction and tracking control. Moreover, it is possible to change the display of the tracking icon 505 to notify the photographer of the fact that tracking control cannot be performed.

In this manner, when a shake having a magnitude that cannot be corrected by the blur correction of the imaging apparatus occurs, the CPU 105 functioning as the tracking state determination unit 120 determines that tracking control cannot be performed. Moreover, the CPU 105 also functions as the tracking icon control unit 123 and changes the display of the tracking icon 505 in response to the determination result of the tracking state determination unit 120 such that it is possible to notify the photographer of the fact that the photographer needs to reliably hold the imaging apparatus so that the shake of the camera 101 decreases.

As described above, in the present embodiment, the tracking state determination unit 120 determines whether tracking control can be performed. When it is determined that tracking cannot be performed, a warning is sent to the photographer such that it is possible to urge the photographer to frame the imaging apparatus to move the subject toward the center of the image and to reliably hold the imaging apparatus.

In the present embodiment, although a method of sending a warning notification using the display of the tracking icon 505 has been described, the following methods may be used as another method of sending a warning.

(1) A warning notification is sent using the tracking icon 505. Specifically, a notification to the photographer indicating that tracking control cannot be performed is realized by blinking the icon on and off. The state in which tracking control cannot be performed may be classified into several levels, and the photographer may be notified of the level by changing the blinking period according to the level.

Figure 17:
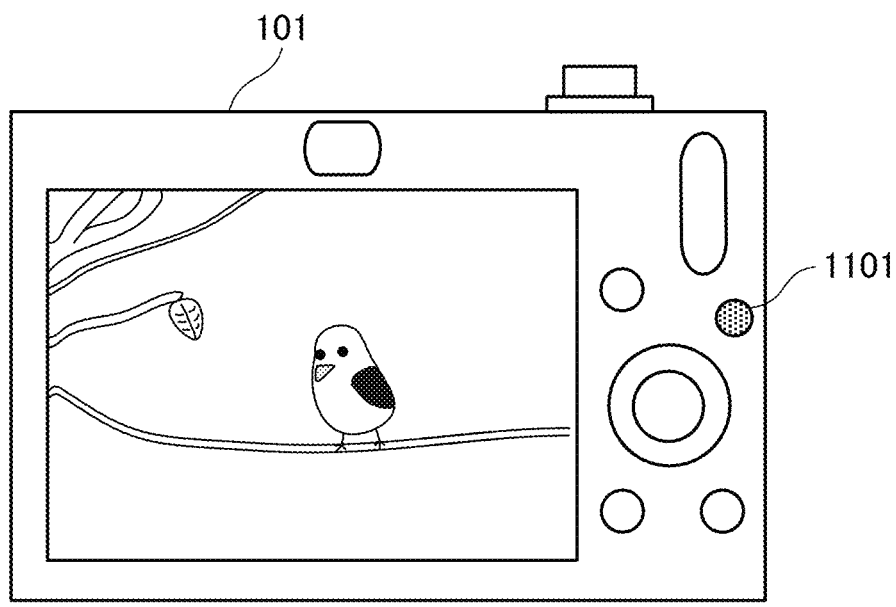
FIG. 17 is a diagram illustrating a configuration example of the imaging apparatus according to the fourth embodiment.

(2) As illustrated in FIG. 17, an LED 1101 (a light emitting unit) may be provided in the camera 101 and a warning notification is sent using the LED 1101. Specifically, a notification to the photographer indicating that tracking control cannot be performed is realized by blinking the LED 1101 on and off. The state in which tracking control cannot be performed may be classified into several levels, and the photographer may be notified of a level of the state in which tracking control cannot be performed by changing the blinking period according to the level. Moreover, the LED 1101 may be turned on when tracking can be performed and the LED 1101 may be turned off when a subject is not designated and tracking control is not performed.

Figure 18:
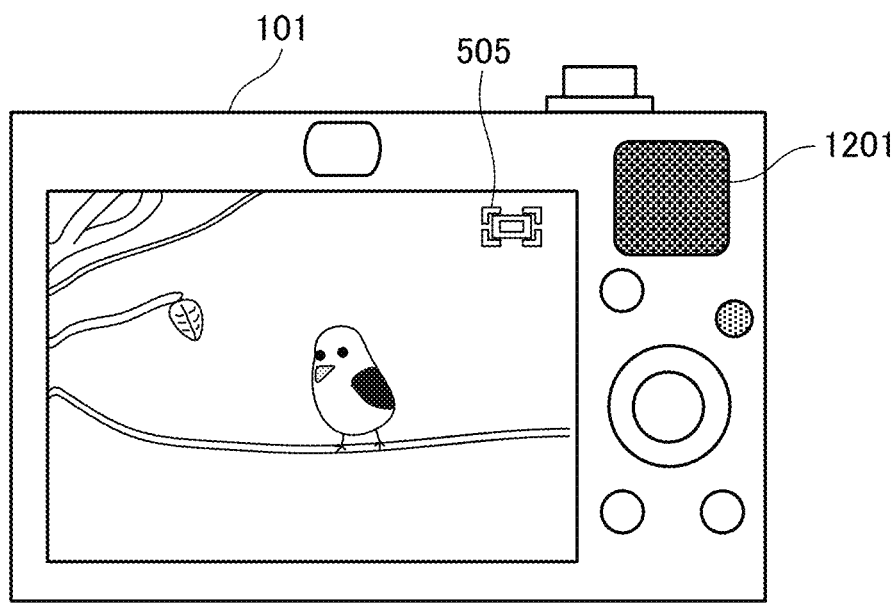
FIG. 18 is a diagram illustrating a configuration example of the imaging apparatus according to the fourth embodiment.

(3) As illustrated in FIG. 18, a sheet-shaped actuator 1201 that generates vibration is provided at a position at which the photographer of the camera 101 usually places his or her finger when the photographer grasps the camera. A notification to the photographer indicating that tracking control cannot be performed is realized by vibrating the actuator 1201. A piezoelectric actuator which uses a piezoelectric element, for example, is used as the actuator 1201. The state in which tracking control cannot be performed may be classified into several levels, and the photographer may be notified of the level of the state in which tracking control cannot be performed may be notified to the photographer by changing the magnitude of the vibration according to the level.

In FIGS. 12A to 12H to FIGS. 16A to 16H, an example in which it is determined whether tracking control can be performed using one determination method has been described. However, it is determined whether tracking control can be performed using a plurality of determination methods. For example, it may be determined that tracking control cannot be performed when a state in which the correction amount is equal to or larger than the trackable threshold Th1 continues the predetermined period TL or longer, and it may be determined that tracking control cannot be performed when a state in which a position shift amount is equal to or larger than the threshold Th3 continues the predetermined period T7 or longer. The determination methods may be combined appropriately. In this case, warning display may be changed according to the determination method, and warning display may be changed depending on the reason why tracking control cannot be performed (due to a large correction amount, due to the subject detection state, or due to a large shake). However, since it may appear complicated to the photographer if there are a number of types of warning display, it is preferable to use the same warning display regardless of a determination method and the reason why tracking control cannot be performed. For example, it is preferable to use the same warning display regardless of whether the reason is due to a large correction amount or a subject detection state. This is because even if there is one warning display, it is possible to promote the operation in which the photographer tracks the subject by a framing operation by using the warning notification.

In the present embodiment, a so-called optical shift method of moving a correction lens within a plane vertical to an optical axis of a photographic optical system is used as an automatic subject tracking unit. However, the present invention is not limited to the optical shift method but the following configurations may be employed.

(1) A configuration for moving an imaging element within a plane vertical to an optical axis.

(2) A configuration for changing a slicing position of respective photographic frames output by an imaging element.

(3) A configuration for rotating a lens barrel including an imaging element and a photographing lens group.

(4) A configuration combined with a rotary pan head capable of panning and tilting an imaging apparatus, provided separately from the imaging apparatus.

(5) A configuration in which the plurality of configurations are combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU) , micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM) , a read only memory (ROM) , a storage of distributed computing systems, an optical disk (such as a compact disc (CD) , digital versatile disc (DVD) , or Blu-ray Disc (BD)™) , a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-244288, filed Dec. 15 2015, Japanese Patent Application No. 2015-239747, filed Dec. 8 2015, and Japanese Patent Application No. 2016-218297, filed Nov. 8 2016, which are hereby incorporated by reference herein in their entirety.

What is claimed is:

1. A control device comprising at least one processor or one circuit which functions as:
    a correction control unit configured to acquire a blur detection signal detected by a blur detection unit to obtain a correction amount of an image blur and control an image blur correction unit configured to correct the image blur;
    a subject detection unit configured to detect a position of a subject in a photographed image and acquire position information of the subject in the photographed image; and
    a setting unit configured to set a subject selectable mode in which a user is able to select a desired subject,
    wherein an image blur correction effect in a second state in which the subject selectable mode is set and the desired subject is selected is higher than an image blur correction effect in a first state in which the subject selectable mode is set and the desired subject is not selected.

2. The control device according to claim 1,
the processor or the circuit further function as:
    a tracking control unit configured to perform tracking control of the desired subject selected in the subject selectable mode based on the position information of the desired subject acquired by the subject detection unit.

3. The control device according to claim 2,
wherein the correction control unit changes the degree of an image blur correction effect based on a subject detection result obtained by the subject detection unit.

4. The control device according to claim 2,
wherein the tracking control unit performs tracking control of the desired subject selected in the subject selectable mode by moving the position of the desired subject based on the position information of the desired subject acquired by the subject detection unit.

5. The control device according to claim 1,
wherein the correction control unit includes a filter for calculating the correction amount and changes the degree of the image blur correction effect by changing characteristics of the filter.

6. The control device according to claim 5,
wherein the characteristic of the filter is the cutoff frequency of the filter.

7. The control device according to claim 6,
wherein the correction control unit raises the image blur correction effect by lowering the cutoff frequency of the filter used in the first state more than the cutoff frequency of the filter that is used in the second state.

8. The control device according to claim 2,
wherein the correction control unit acquires the blur detection signal to determine whether panning or tilting is performed, changes the characteristics for calculating the correction amount according to a determination result, and performs control to change the degree of the image blur correction effect by performing a process of shifting the correction amount further closer to a center of a control range when it is determined that panning or tilting is performed than that when it is determined that panning or tilting is not performed.

9. The control device according to claim 4,
wherein the tracking control unit performs the tracking control of the subject by moving the position of the subject in the photographed image to decrease the distance between the position of the subject in the photographed image and a predetermined position in the photographed image, and
wherein the correction control unit performs control to decrease the image blur correction effect when the distance between the position of the subject and the predetermined position is equal to or larger than a threshold to be lower than the image blur correction effect when the distance between the position of the subject and the predetermined position is smaller than the threshold.

10. The control device according to claim 1, the processor or the circuit further functions as:
    a reliability determination unit configured to compare a reliability of the detected subject with a threshold to determine the reliability of the subject,
    wherein the correction control unit performs control to increase the image blur correction effect when the reliability is equal to or larger than the threshold to be higher than the image blur correction effect when the reliability is smaller than the threshold based on a determination result obtained by the reliability determination unit.

11. The control device according to claim 1,
wherein the correction control unit includes a filter for calculating the correction amount and changes the degree of the image blur correction effect by changing the characteristics of the filter.

12. The control device according to claim 1, the processor or the circuit further functions as:
    a determination unit configured to determine whether tracking control of the subject is able to be performed; and
    a warning instruction unit configured to issue a warning when the determination unit determines that tracking control of the subject is not able to be performed.

* * * * *